(12) United States Patent
von Trapp

(10) Patent No.: US 11,461,669 B2
(45) Date of Patent: Oct. 4, 2022

(54) RUNTIME PREDICTION FOR A JOB OF A WORKFLOW

(71) Applicant: CA Software Österreich GmbH, Vienna (AT)

(72) Inventor: Gardiner Whitehead von Trapp, Vienna (AT)

(73) Assignee: CA SOFTWARE ÖSTERREICH GMBH, Vienna (AT)

( * ) Notice: Subject to any disclaimer, the term of this patent is extended or adjusted under 35 U.S.C. 154(b) by 987 days.

(21) Appl. No.: 16/166,038

(22) Filed: Oct. 19, 2018

(65) Prior Publication Data

US 2020/0125963 A1    Apr. 23, 2020

(51) Int. Cl.

| | |
|---|---|
| *G06F 9/44* | (2018.01) |
| *G06N 5/02* | (2006.01) |
| *G06F 11/00* | (2006.01) |
| *G06F 9/48* | (2006.01) |
| *G06N 20/20* | (2019.01) |
| *G06N 5/00* | (2006.01) |
| *G06N 7/00* | (2006.01) |
| *G06F 11/34* | (2006.01) |

(52) U.S. Cl.
CPC ........... *G06N 5/022* (2013.01); *G06F 9/4881* (2013.01); *G06F 11/006* (2013.01); *G06F 11/3419* (2013.01); *G06F 11/3452* (2013.01); *G06N 5/003* (2013.01); *G06N 7/005* (2013.01); *G06N 20/20* (2019.01); *G06F 2201/805* (2013.01)

(58) Field of Classification Search
CPC ...................................................... G06N 5/022
USPC ............................................................ 706/46
See application file for complete search history.

(56) References Cited

U.S. PATENT DOCUMENTS

| | | | |
|---|---|---|---|
| 2013/0151453 A1* | 6/2013 | Bhanot | G06Q 10/06375 706/46 |
| 2016/0098292 A1* | 4/2016 | Boutin | G06F 9/505 718/104 |
| 2018/0293511 A1* | 10/2018 | Bouillet | H04L 67/12 |
| 2019/0050750 A1* | 2/2019 | Le | G06N 3/0427 |

OTHER PUBLICATIONS

Breiman, Leo, "Random Forests", Jan. 2001 (33 pages).

(Continued)

*Primary Examiner* — Timothy A Mudrick
(74) *Attorney, Agent, or Firm* — Bakerhostetler

(57) ABSTRACT

A method may comprise accessing first data sets associated with a first job of a workflow, each first data set associated with an execution of the first job, each first data set specifying a runtime of the first job and a first plurality of feature values of features associated with the runtime; executing a first plurality of feature weighting analyses utilizing the first data sets to rank the plurality of features with respect to their predictive value on a runtime of the first job; and generating, using at least one data processing apparatus, a predicted runtime of the first job based on a time series analysis of a plurality of runtimes of a plurality of second data sets, the second data sets selected from the first data sets based on the rank and one or more expected feature values associated with a future execution of the first job.

20 Claims, 15 Drawing Sheets

(56) References Cited

OTHER PUBLICATIONS

Scikit Learn, "1.11 Ensemble Methods," scikit-learn.org (2007); URL: < http://scikit-learn.org/stable/modules/ensemble.html#b2001> (23 Pages).
Scikit Learn, "3.2.4.3.1 sklearn.ensemble.RandomForestClassifier," scikit-lear.org, (2007) URL < http://scikit-learn.org/stable/modules/generated/sklearn.ensemble.RandomForestClassifier.html>. (11 pages).

* cited by examiner

RUNTIME PREDICTION FOR A JOB OF A WORKFLOW

BACKGROUND

Modern software systems often include multiple programs or applications working together to accomplish a task or deliver a result. An enterprise can maintain several such systems. Further, development times for new software releases are shrinking allowing releases to be deployed to update or supplement a system on an ever-increasing basis. Some enterprises release, patch, or otherwise modify their software code dozens of times per week. Further, enterprises can maintain multiple servers to host their software applications, such as multiple web servers deployed to host a particular web application. As updates to software and new software are released, deployment of the software can involve coordinating the deployment across multiple machines in potentially multiple geographical locations.

BRIEF DESCRIPTION OF THE DRAWINGS

Like reference numbers and designations in the various drawings indicate like elements.

DETAILED DESCRIPTION

Figure 1:
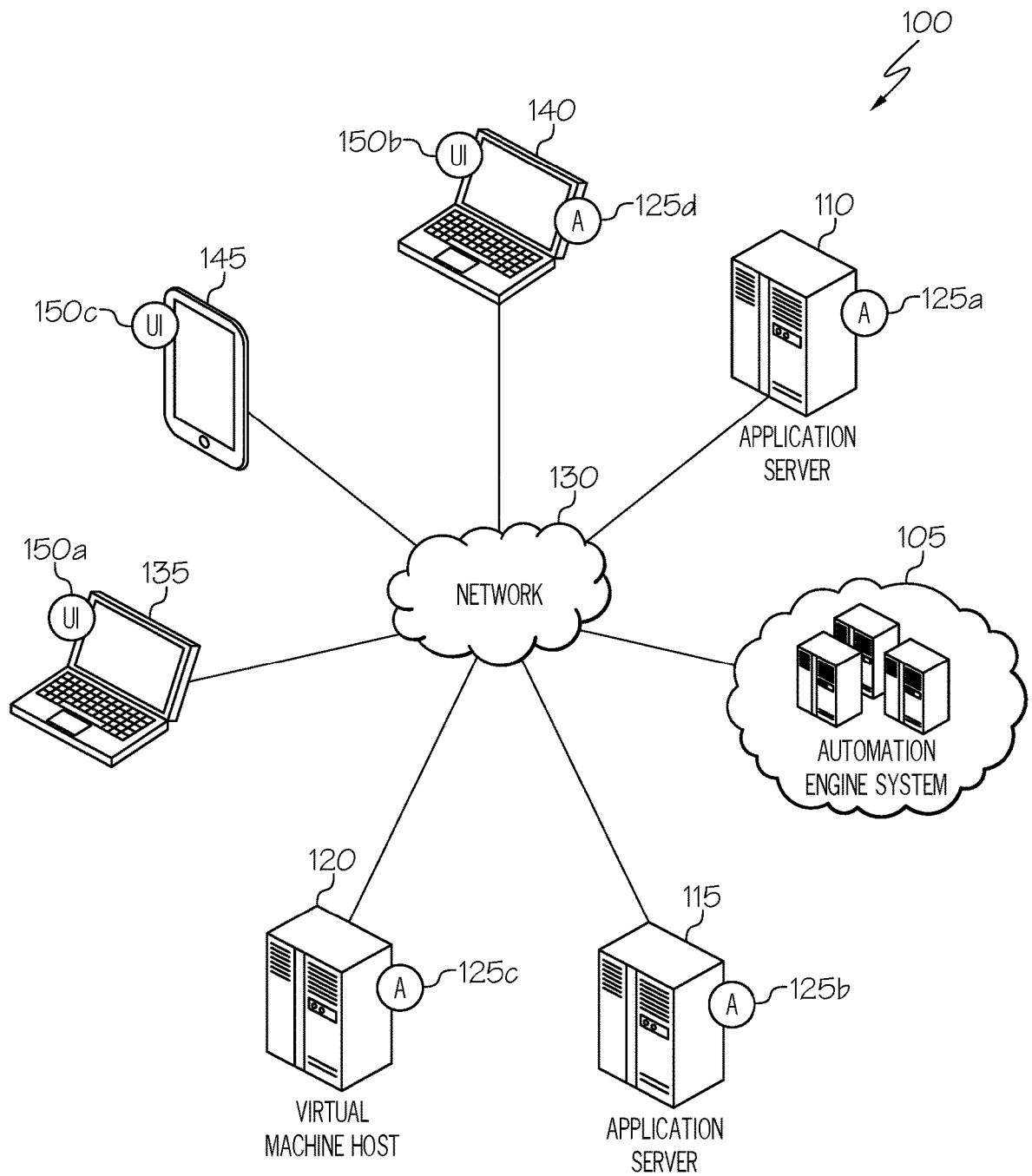
FIG. 1 is a simplified schematic diagram of an example computing system including an example deployment automation system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.), or by combining software and hardware implementations, any of which may generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be a tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing environment 100 including an example automation engine system 105. The automation engine system 105 may be implemented on one or multiple host server devices and may flexibly implement a variety of software automation solutions and applications including release automation, workload automation, and automated service orchestration. An automation engine system may implement an automation engine implemented through a collection of interconnected work processes (hosted on one or more of the servers of the automation engine system 105) and communication processes (hosted on one or more the servers of the automation engine system 105). The work processes may be configurable to perform tasks to automate a variety of tasks (e.g., jobs of one or more workflows) on a computing system local to or remote from the automation engine system 105. For instance, an automation engine hosted on automation engine system 105 may automate workflows utilizing software applications, scripts, applets, or other software programs hosted on one or multiple different target computing systems, such as application server systems (e.g., 110, 115). In other instances, the automation engine may be utilized to orchestrate a service or automate the deployment and installation of a new software release on one or more of these systems (e.g., 110, 115) or other computing systems (e.g., a virtual machine or container-based host system (e.g., 120)), among other examples. Hosts and server systems may also be implemented on personal computing devices (e.g., 140), Internet of Things (IoT) devices, smart home systems, media consoles, smart appliances, and other computing systems, which may interface with an automation engine (on automation engine system 105) over one or more networks (e.g., 130) in connection with workflow automation, release automation, service orchestration, or other software automation applications supported by the automation engine.

In some implementations, agents (e.g., 125*a-d*) may be provisioned on host systems (e.g., 110, 115, 120, 140) to provide a hook for the automation engine to control operating system tasks or other operations and functionality provided on a host system through an operating system, hypervisor, application, or other software program, which may facilitate a workflow automation, release automation, service orchestration, or other software automation implementation. An automation engine may communicate with various agents deployed within host systems (e.g., 110, 115, 120, 140), for instance, through communication processes implementing the automation engine. In some implementations, communication processes may support and implement network communications (e.g., over one or more networks (e.g., 130)) between the computing system(s) (e.g., 105) hosting the work processes and other components of the automation engine. Further, in some implementations, user interfaces (e.g., 150*a-c*) may be defined in connection with the automation engine, which may be accessed on one or more user computing devices (e.g., 135, 140, 145), for instance, as a web-based or browser-implemented user interface. Users may provide inputs and define parameters for an automation implemented by the automation engine through these UIs (e.g., 150*a-c*). The inputs may be routed to one or more of the work processes of the automation engine using the communication processes of the automation engine, to allow for the definition of new or customized (e.g., user customized) automations provided through the automation engine, among other examples.

In general, "servers," "clients," "computing devices," "network elements," "database systems," "user devices," and "systems," etc. (e.g., 105, 110, 115, /syst, 135, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, zOS, etc., as well as virtual machines and emulators adapted to virtualize execution of a particular operating system, as well as container-based operating environments (e.g., Docker containers, Kubernetes containers, etc.), and customized and proprietary operating systems among other examples.

Further, servers, clients, network elements, systems, and computing devices (e.g., 105, 110, 115, 120, 135, 140, 145, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, an automation engine system 105, application server (e.g., 110, 115), host server 120, or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Through the advent of cloud and distributed computing architectures, together with agile software development paradigms, the management and implementation of software systems by enterprises has become increasingly complex. For instance, as computing systems migrate to cloud or hybrid cloud environments, managing workflows and deployment of new software may be more complex and costly without information technology automation. Further, given the rapid pace of software innovation, versioning, and updates, the pace at which software is released and orchestrated has likewise increased. For instance, in the case of release automation, releases and updates may be frequent, complex, and expensive to deploy in modern software systems. Managing the potentially thousands of software releases, even relating to a single entity's (e.g., enterprise's) system, can be difficult and exact costs on the very operability of the system. Such releases include both releases of new software systems as well as updates or patches to existing software. Valuable information technology (IT) personnel and resources are dedicated within some enterprises to developing and carrying-out these deployments. Traditionally, human users are employed throughout the process of the deployment. Further, human IT resources are not only expensive, but error prone, resulting in some deployments which are incorrect and that may need to be re-deployed, further consuming time and personnel resources. Additionally, some systems may be sensitive to down periods that may be required in order to allow deployment of new software releases on the system, among other complexities, costs, and variables. Similar complexities and costs are introduced when considering the orchestration of new services, managing workflows in transactions to be handled and developed using a software system, among other example considerations.

Automation tools and processes may be purpose built to handle common automation tasks, however, given the diversity and continuing evolution of enterprises' software systems, specialized, purpose-built automation tools are often ill-equipped to adapt to the ever-changing landscape of modern software products and systems. In some implementations, a flexible, scalable, and configurable automation engine may be provided, which is capable of being used, reused, and repurposed, dynamically, to provide a single automation platform capable of handling and be extended to handle a wide and diverse array of automation workloads and tasks. At least some of the systems described in the present disclosure, such as the systems of FIGS. 1 and 2, can include functionality providing at least some of the above-described features that, in some cases, at least partially address at least some of the above-discussed issues, as well as others not explicitly described.

Figure 2:
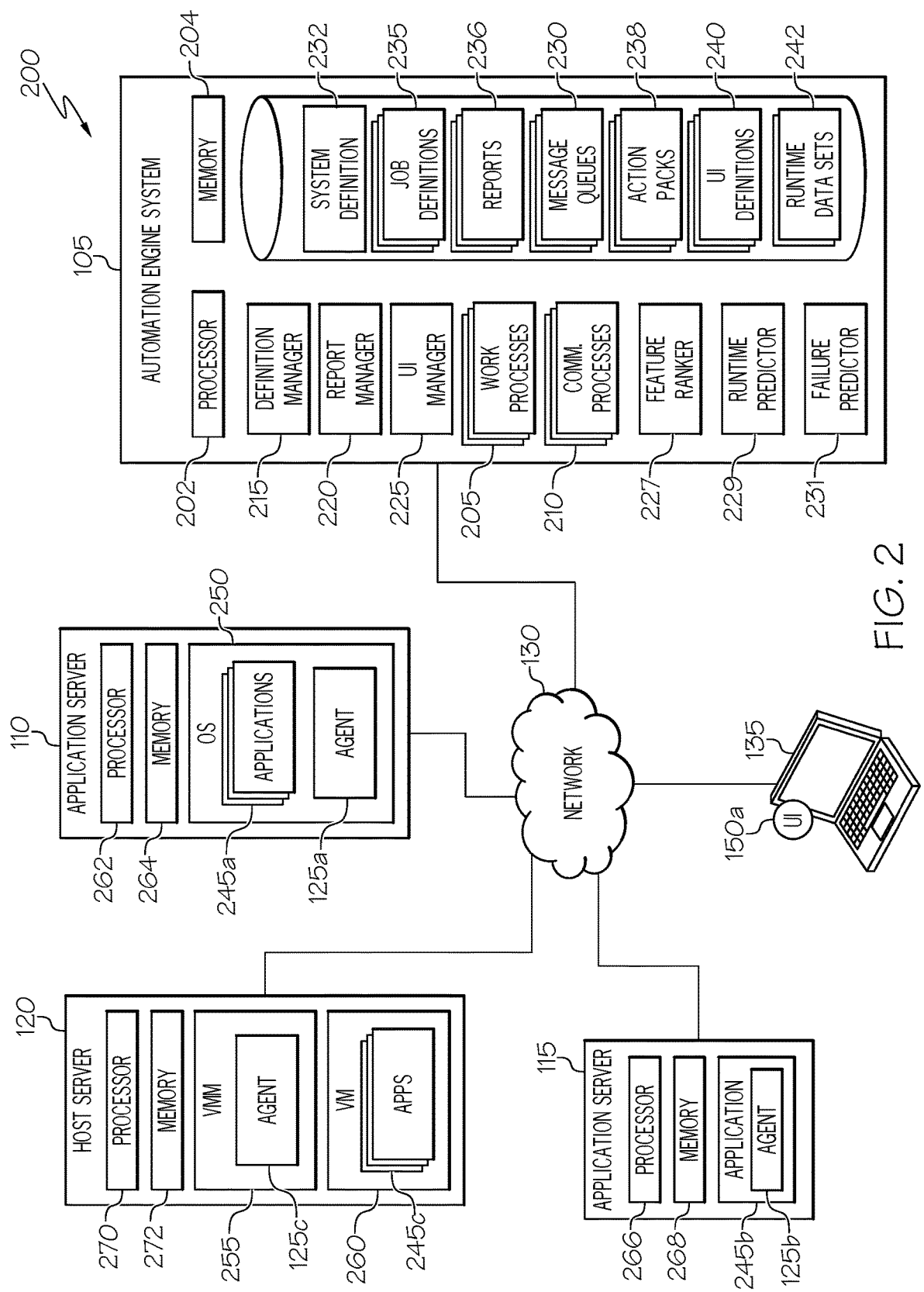
FIG. 2 is a simplified block diagram of an example computing system including an example deployment automation engine in accordance with at least one embodiment.

For instance, in the example of FIG. 2, a simplified block diagram 200 is shown illustrating an example environment including an example implementation of an automation engine system 105. An automation engine implemented using the automation engine system 105 may be composed of a collection of work processes 205 and communication processes 210. Work processes (e.g., 205) are server processes implemented within the automation engine to perform the actual server work in various automations, such as activating, generating, and executing tasks within a given automation job, together with monitoring the status of the tasks and collecting information (and generating report data) relating to the completion of these tasks. Work processes 205 may retrieve tasks from a queue, with the tasks including logic executable by the work process to cause the work process to perform a particular type of task. When the work process 205 accesses a next task from the queue, it may retrieve corresponding logic and perform the next task, which may be the same or a different type of task than the task previously performed by the work process. Indeed, the flexibility of the work processes allow a configurable mix of tasks and corresponding jobs to be handled by the collection of the work processes 205 in the automation engine, allowing the automation engine to respond dynamically to what may be a changing and diverse workload the automation engine is called on to handle. In other instances, work processes may be configured to be dedicated to handling particular types of high priority or low latency tasks, such that all of the work process's bandwidth is directed toward these types of tasks in the automation engine's workload (e.g., despite the work process being otherwise operable to handle potentially any one of the variety of tasks in jobs handled by the automation engine).

Further, one of the work processes implemented in the automation engine may be designated as the "primary" work process. A primary work process, in some examples, may be designated at the launch of the automation engine (e.g., based on the work process being the first to start) and this primary work process may be assigned special tasks based on its designation as the primary process, such as central work process tasks. In some cases, the primary work process may be tasked with autonomously assigning roles to additional work processes as they are started within the automation engine. In some implementations, work processes may be assigned roles to filter the types of tasks the respective work process is to handle. For instance, some work processes may be assigned (e.g., by the primary work process) to perform an output server role to handle outputs such as storing log messages and reports generated in the automation engine within a database of the automation engine. Another example server role which may be assigned to work processes may be a resource calculation role to perform tasks such as calculating calendar objects, perform deadlock avoidance, and other tasks, which involve calculations, among other examples. In some implementations, separate queues may be maintained in the automation engine database for each server role, such that tasks of a given work process are extracted from the specific queue corresponding to the work process's assigned role, among other example features and implementations.

Communication processes (e.g., 210) are additional server processes running on one or more computing systems (e.g., 105) implementing an instance of an automation engine. Communication processes 210 may handle communication between agents (e.g., 125a-c)), user interfaces (e.g., 150a), and work processes (e.g., 205) in connection with the automation engine. Communication processes hold the connections to the agents and the user interfaces. In some implementations, all communication between agents and UIs may be exclusively performed through the communication processes 210. In some implementations, port numbers of the systems hosting the automation engine may be assigned to respective work processes and communication processes. Any of the server processes (e.g., work processes 205 and communication processes 210) may communicate with any other server processes. Such an architecture can ensure flexibility and fault tolerance, allowing remaining processes to assume the queued tasks of another process in the event the other process fails, among other example features and advantages.

As noted above, a communication process can connect with agents (e.g., 125a-c) and UIs (e.g., 150a) to facilitate the communication between the agents and UIs and various work processes (e.g., 205) of an automation engine implementation. Agents may be implemented on target systems (e.g., 110, 115, 120) to expose functionality of an operating system (e.g., 250), application (e.g., 245b), virtual machine manager (e.g., 255), or other software program to the automation engine. Accordingly, agents may be implemented according to the specific features of the target software component (e.g., 245b, 250, 255, etc.). As an example, different agents may be provided for instrumentation on any one of a variety of different operating systems, such as agents specific to Windows, Linux, iOS, zOS, etc., among other examples. In some implementations, agents may initiate connections with one of the communication processes provided in an automation engine. For instance, an agent may open a TCP/IP connection with one of the communication processes of the automation engine. In some implementations, each agent may connect to a single one of the communication processes, while each communication process may be connected to multiple agents and/or user interfaces. Communications between the agent and a communication process may be encrypted.

As discussed in the examples above, a collection of work and communication processes may be provided in an automation engine system. In some cases, it may be advantageous to host the work processes 205 and communication processes 210 on multiple nodes or computing devices, as this can enhance fault tolerance of the automation engine and boost efficiency and reliability through the distribution of these processes over several computers. In some implementations, a potentially unlimited number and variety of work and communication processes may be implemented in a single automation engine instance. Further, by adding processes it is possible to adjust to growing use of the automation engine system. For instance, should a heavy workload exist or be introduced due to the number of logged-on agents and/or UIs, the number of communication processes can be increased. Likewise, should the number of automation engine system tasks become too burdensome, the number of work processes can be increased, among other example advantages.

As further illustrated in FIG. 2, an example automation engine system 105 may include one or more data processing apparatus (e.g., 202), one or more computer memory elements 204, and other components and logic, implemented in hardware circuitry and/or software to implement an automation engine instance. For instance, a definition manager 215 may be provided, through which a system definition file 232 may be accessed, modified, and/or defined. A system definition 232 may define the number of work processes 205 and communication processes 210 within an automation engine instance, as well as detail the individual computing systems hosting these server processes, the ports assigned to each process, among other information utilized to define an automation engine instance. A definition manager 215 may additionally access and/or define job definitions, which may correspond to automation jobs that may be performed by the automation engine. The job definitions 235 may additionally detail the combination of automation tasks and the target systems involved in the performance of these tasks in the furtherance of such automation jobs. Automation jobs may provide the information to be loaded into work queues consumed by work processes 205 in the automation engine. In some cases, automation jobs may be packaged in action packs (e.g., 238), which may be pre-generated packages of common types of automations, which may be reused and redeployed in various customers' respective automation engine instances. An individual instance of an automation engine may allow a user or manager to parameterize the action pack to enable the action pack's use within a particular customer's system (with its component target systems) (e.g., using definition manager 215). In some implementations, a report manager 220 may also be provided, which may enable user access to reports 236 and other data generated through the execution of various automation jobs by the automation engine (e.g., as generated by work processes 205 within the automation engine). A UI manager 225 may also be provided, in some implementations, to allow users or managers to define new UIs or parameterize UI templates for use in providing UIs (e.g., 150a) that are to interface with and be used in connection with automation jobs performed by an automation engine deployment. UI definitions 240 may be generated and maintained by the automation engine system 105 to form the basis of these UIs (e.g., which may be presented through web- or browser-based interfaces on potentially any user endpoint device (e.g., 135) capable of connecting to the automation engine over a private or public network (e.g., 130)).

In some implementations, communication between server processes of an automation engine (e.g., its component work processes 205 and communication processes 210)) may be facilitated through message queues 230. Message queues (as well as other data used to implement an automation engine instance (e.g., 232, 235, 236, 240, etc.)) may be hosted in a database implemented in connection with the automation engine and hosted on one or more of the computing systems of automation engine system 105. Message queues (e.g., 230) may be implemented as database tables, through which a work or communication process may post a message that may then be read and processed by another work or communication process, thereby facilitating communication between the processes. Additional queues may also be provided which contain the tasks that are to be accessed by server processes and performed in connection with an automation engine implementation. In some implementations, an automation engine instance may have multiple message queues. Depending on their types, tasks are lined up in the corresponding queue. If a work process is momentarily idle or finished with its current tasks, it will take the next queued task and process it. The execution of the task can lead to a new task for the work queue to be then attached to the current tasks. Some tasks may be dedicated tasks, which are allowed to only be processed by the primary work process. Accordingly, in such implementations, a primary work process, upon completing a preceding task, may first check (in a corresponding queue) whether any special work tasks are waiting in the queue before turning to more general work queues for generally work tasks shared with the other work processes. or this reason, the "freed-up" primary work process always checks first if any of these special work processes are present in the queue. Communication processes may utilize communication queues for communication tasks to be performed by communication processes to collect or send data from/to agents and/or UIs associated with the automation engine. In some instances, if a work process tasks involves the passing of information to agents or UIs, the work process may, as part of the performance of its task, write a new communication queue to the respective communication queue in order to prompt the communication process's involvement in the passing of this information, among other examples.

As noted above, an automation engine provided through an automation engine system 105 may be used to automate activities on various target systems (e.g., 110, 115, 120). For instance, application servers (e.g., 110, 115) hosting various applications and other software tools and programs (e.g., 245*a-b*) may be target systems of an automation engine. For instance, tasks automated by an automation engine may automate deployment of a new or updated version of an application or system of interoperating programs on one or more computing systems (e.g., 110, 115, 120). In other examples, a workflow involving one or more multiple different cooperating applications (e.g., 245*a-c*) may be automated may be automated using an automation engine, among other examples. The automation engine may interface with agents to cause functionality present on the target system to be triggered and automated according to defined automation engine tasks and jobs. In some instances, agents (e.g., 125*a*) may be present on an operating system (e.g., 250) of the host system (e.g., 110), on which a target application (e.g., 245*a*) runs. In other instances, the agent (e.g., 125*b*) may be present on the application (e.g., 245*b*) itself. During the automation of a workflow, the automation engine may communicate with and cause actions to be performed on multiple different applications (e.g., 245*a-c*) and host systems (e.g., 110, 115, 120) through corresponding agents (e.g., 125*a-c*). In automation jobs involving service orchestration or release automation, agents (e.g., 125*a, c*) may be used to access functionality and resources of the system that are used to deploy, install, configure, load, or otherwise automate deployment or installation of a program on one or more target systems. As an example, an application may be automatically deployed on a virtual machine using an example automation engine, through the automation engine's communication with an agent (e.g., 125*c*) provided on a virtual machine manager (VMM) or hypervisor (e.g., 255) that is to automatically build the host virtual machine (e.g., 260) upon which the application (e.g., 245*c*) is to be installed and run at the direction of the automation engine, among other examples.

Automation engine system 105 may also include a feature ranker 227, runtime predictor 229, and failure predictor 231. These components may be implemented in hardware circuitry and/or software and may access runtime data sets 242 to perform their respective functions. Runtime data sets 242 may each be associated with an execution of a particular job of a workflow and may include information about the execution of the job. A particular data set may include a runtime of the associated job (e.g., a length of time that the job took to execute) as well as feature values associated with execution of the job. The feature values may include parameters describing the conditions under which the job was executed. A data set may include feature values for any suitable features of the job, such as a date the job was executed, the time the execution of the job was started, the day of the week that the job was executed, the time the execution of the job completed (with and/or without post processing time), a target computing system on which the job was executed, an operating system that executed the job, a context of the job (e.g., the workflow in which the job was executed, one or more jobs preceding and/or following the particular job, or other context associated with the job), whether the job successfully completed execution, a predicted runtime for the job (e.g., which may be predicted using any of the methods described herein) generated prior to execution of the job, or other suitable features.

Runtime data sets 242 may be collected in any suitable manner. In some embodiments, automation engine system 105 (e.g., via work processes 205) may communicate with agents (e.g., 125*a-c*) to obtain data to include in the runtime data stores. In various embodiments, automation engine system 105 may generate data to be stored in runtime data stores.

Feature ranker 227 may execute a feature weighting analysis utilizing runtime data sets 242 associated with a particular job to rank features with respect to their predictive value on the runtime of that job. Runtime predictor 229 may utilize the output of the feature ranker 227 to select a plurality of data sets having feature values that match the feature values expected for a future execution of the job, wherein the feature values used to select the data sets are feature values of features determined by the feature ranker 227 to have predictive value for the runtime. Runtime predictor 229 may then generate a predicted runtime of the job based on a time series analysis of the runtimes of the selected data sets. Runtime predictor 229 may perform similar functions for multiple jobs of a workflow and estimate a runtime for the entire workflow based on a critical path through the workflow. Failure predictor 231 may determine a likelihood of failure of a particular job based on a monitored runtime of the job and a time series analysis of previous executions of the job. These components and their functions will be described in greater detail below.

Figure 3:
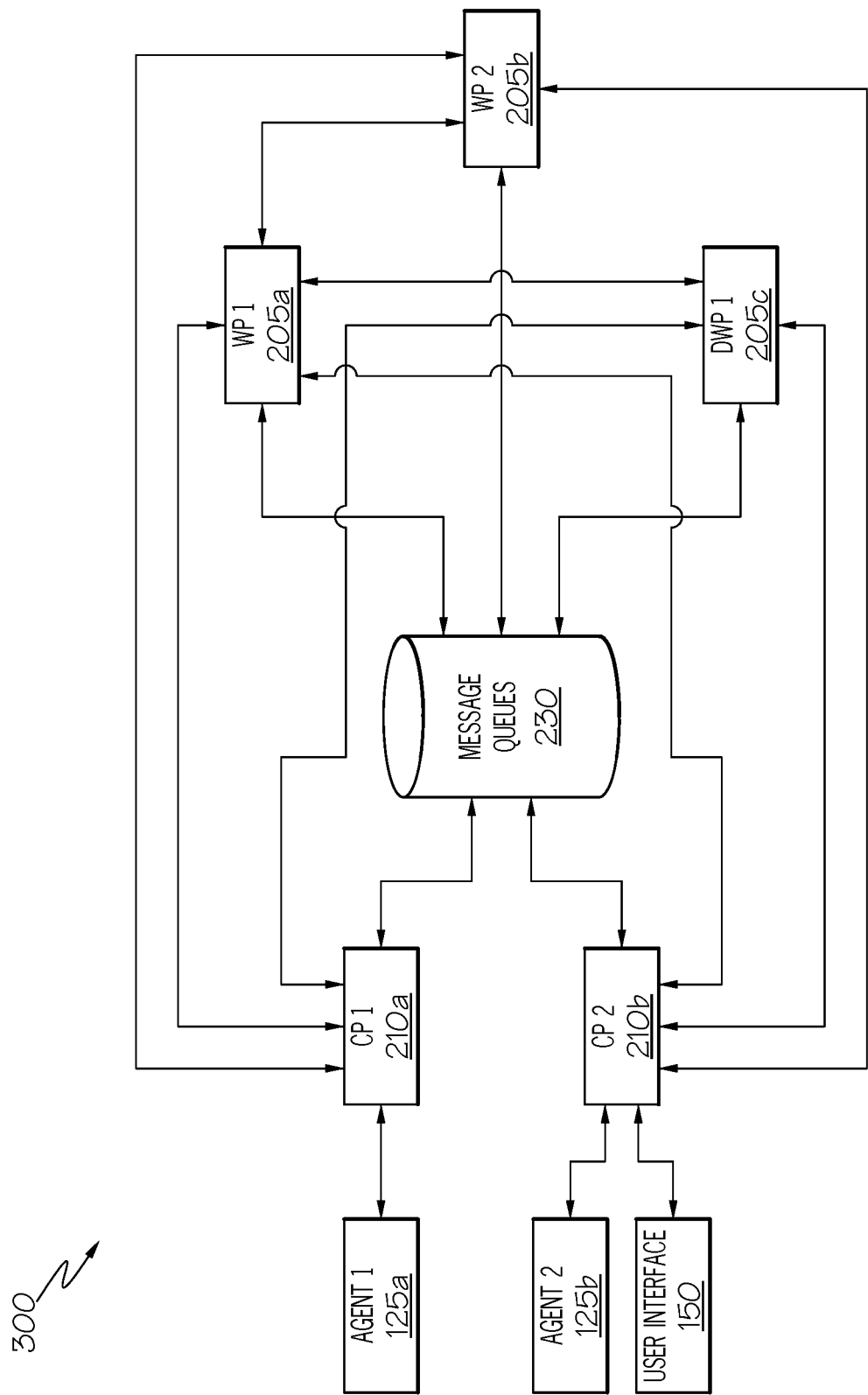
FIG. 3 is a simplified block diagram illustrating an example system including multiple deployment nodes in accordance with at least one embodiment.

Turning to FIG. 3, a simplified block diagram 300 is shown illustrating an example automation engine implementation. In this simplified example, the automation engine may be implemented through work processes 205*a-c*, communication processes 210*a-b*, and a database hosting automation engine information including tables implementing message queues (e.g., 230) of the automation engine. In this example, work process 205*a* may be designated as the primary work process and may connect with and oversee the launch of the other work processes (e.g., 205*b-c*) in the automation engine. One or more of the work processes (e.g., 205*c*) may be a dedicated work process, dedicated to performing a particular type of task (e.g., a dialogue work process (DWP) specifically for use in handling UI messages (e.g., from UI 150)), while other work processes (e.g., 205*b*) are general purpose work processes, which may be utilized to handle potentially any type of work task to be performed in the automation engine. Each work process (e.g., 205*a-c*) may interface with one or more message queue tables to obtain new tasks for execution and/or communicate messages with other work processes or communication processes in the automation engine. Likewise, communication processes (e.g., 210*a-b*) may interface with message queues 230. Some message queues may be dedicated message queues, reserved for a particular subset of the server processes (e.g., 205*a-c*, 210*a-b*) in the automation engine, while other queues may be provided for access and use by potentially any one of the automation engine server processes. Each communication process (e.g., 210*a-b*) may be connected to one or more agents (e.g., 125*a-b*) and/or one or more UIs (e.g., 150) provided for interfacing with the automation engine. Agents (e.g., 125*a-b*) may expose functionality of a target system for use by the automation engine. UIs may be provided to enable users to submit information for use by the automation engine and/or to present information (e.g., prompts, results, status updates, etc.) generated by the automation engine to the user, among other examples.

It should be appreciated that an automation engine may include any potential number of one or more work processes and communication processes. As the workload to be handled by the automation engine or the general complexity of the automation engine implementation increases, additional work and/or communication processes and corresponding message queue tables may be added to expand the bandwidth and flexibility of the automation engine. Likewise, the scale and scope of an automation engine may also be reduced, by removing work and/or communication processes, among other examples. As an illustrative example of a job, which may be performed by an example automation engine, a workflow involving an example customer relationship management (CRM) platform may be automated using an example automation engine, such as shown in the example of FIG. 3. Jobs may be defined, which are designed to automate the generation of social media promotions (e.g., handled by a first target system) based on events detected using a second target system (e.g., a system that can forecast or detect weather patterns and/or predict foot traffic within a retail establishment, etc.).

In one example, when certain weather conditions are detected or predicted, an example workflow can cause a social media management system to automatically generate a promotional posting on one or more social media platforms to promote an offering appropriate for the detected weather (e.g., an ice cream promotion on a hot day). For instance, a first one of the work processes (e.g., 205*b*) may perform a task to cause a weather forecast to be performed using a first target system. The performance of this task may involve causing a communication process (e.g., 210*a*) interfacing with the target system through a corresponding agent (e.g., 125*a*) to send a communication to the agent to engage with the target system and cause the target system to generate forecast data. This forecast data may be passed back to the automation engine by the agent 125 through the communication process 210*a*, and the forecast data may be provided to a message queue and cause a task to be performed by one of the work processes to access and process the forecast data returned from the target system. For instance, work process 205*a* may be free to handle the task of processing the forecast data, with the task involving determining a weather event from the forecast data. In one example, a work process 205*a* may determine that the forecast data evidences a warm weather event. The detection of a warm weather event may cause a task to be queued to trigger the social media promotion on a social media system. The workflow definition may embody the logic, executed by the work processes to determine an action, result, or next task to execute based on results of the preceding task. In one example, a free work process may access the queued task and communicate an instruction to launch the social media promotion through a communication process (e.g., 210*b*) interfacing with the social media system through a corresponding agent (e.g., 125*b*), among other example implementations and use cases. Indeed, it should be appreciated that potentially any combination of the provided work processes (e.g., 205*a-c*) in the automation engine may perform various tasks within a single automation job (e.g., a workflow automation job, service orchestration job, release automation job, etc.) based on the availability of the various work processes. Further, an automation engine may simultaneously handle multiple different automation jobs using the same collection of work processes and communication processes 210*a-b*, balancing work of the multiple jobs between the collection of processes in the automation engine, among other example implementations.

Scheduling deployments of automated workflows across one or more target computing systems may be difficult, particularly in large organizations where multiple deployments and updates are being managed across the enterprise. Avoiding scheduling and deployment conflicts is a critical component of efficient management of computing devices used to perform jobs of a workflow.

In various embodiments, the scheduling of workflows is improved by utilizing predicted runtimes of jobs and workflows. In one example, a time series algorithm may be executed based on data collected for past executions of jobs to predict runtimes for jobs of a workflow. A critical path through the workflow may be selected and an estimated runtime of the critical path calculated. When the workflow is executed, the actual runtimes of the jobs may be tracked and reported to allow dynamic adjustment of workflows and to improve future runtime predictions.

In various embodiments, in order to predict a runtime of a particular job, past executions of the job may be analyzed to rank features of the job that are predictive of the runtime of the job. For example, a decision tree model (e.g., a random forest decision tree model) may be applied to various data sets to rank the features with respect to their predictive value on the runtime of the job. A time series analysis may then be run on data sets based on these predictive features to improve the runtime estimation. Results obtained from the runtime predictions may be used to automate scheduling and scheduling management of workflow deployments.

In various embodiments, the progress of the workflow may be assessed and the runtime prediction of the workflow may be dynamically updated based on observations of the actual runtimes of executed jobs and/or adjustment of runtime predictions for future jobs and the entire workflow.

In addition to predicting runtimes, likelihoods that jobs of the workflow will fail may be determined prior to runtime. In some embodiments, these likelihoods may be dynamically updated as the workflow progresses. Adjustments to the workflow may be made dynamically as the likelihood of a particular job or the entire workflow failing changes.

Various embodiments disclosed herein may provide one or more technical advantages. For example, a particular embodiment may enable the bandwidth of one or more computing systems to be utilized more efficiently using intelligent scheduling. As another example, a particular embodiment may improve utilization of resources of one or more computing systems by canceling a job that is expected to fail prior to actual failure of the job. As another example, a particular embodiment may provide improved metrics associated with job runtimes to be provided to promote intelligent and efficient software deployments.

Figure 4:
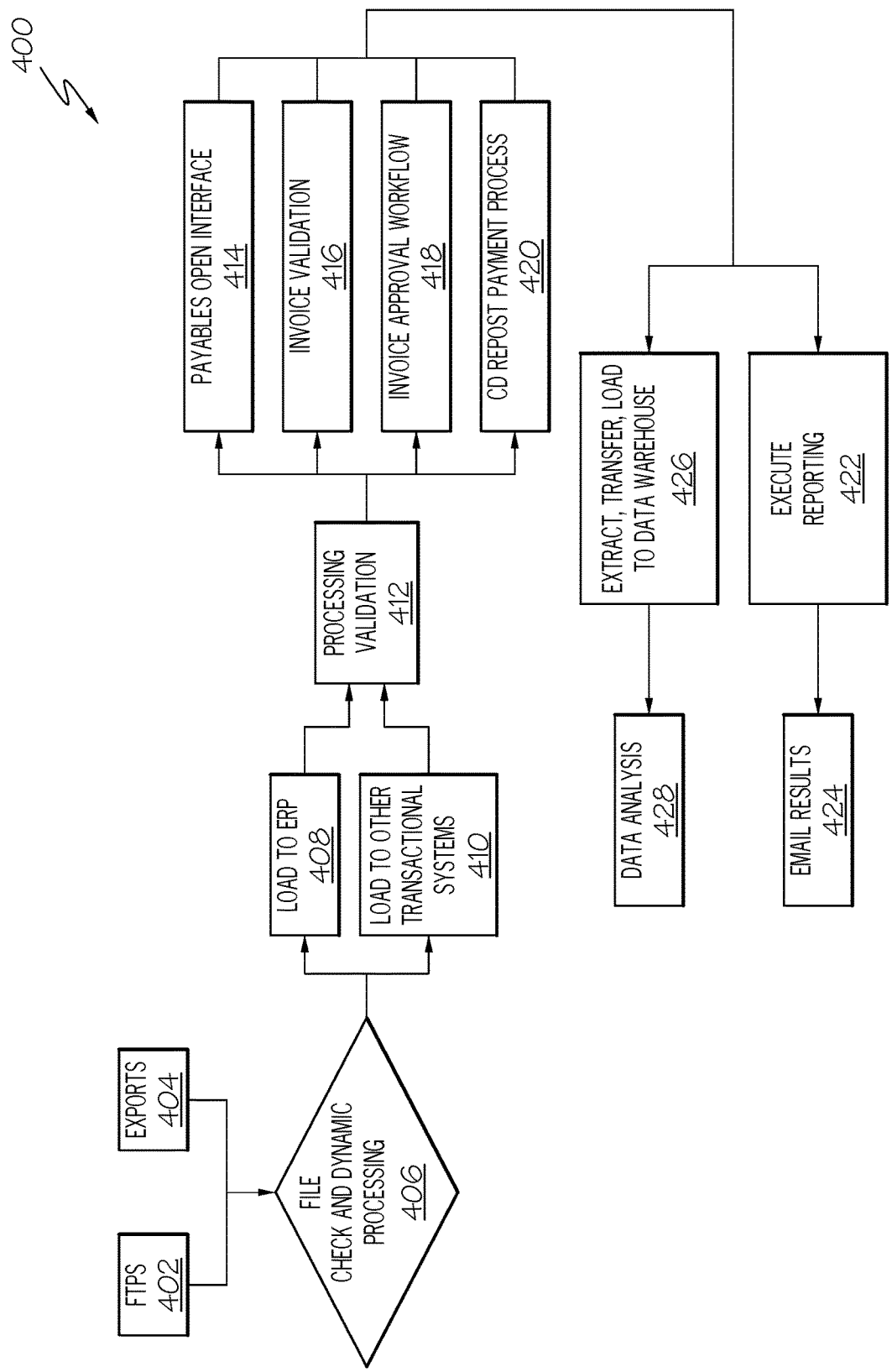
FIG. 4 is a simplified block diagram of an example workflow in accordance with at least one embodiment.

FIG. 4 is a simplified block diagram of an example workflow 400 in accordance with at least one embodiment. A workflow may comprise a linked combination of jobs (e.g., 402-428) executed in an automated sequence. A workflow may comprise any suitable number of jobs linked in any suitable manner that when executed perform a set of tasks. In various embodiments, a workflow may be executed to perform various processes on behalf of an enterprise. As various examples, a workflow may comprise a plurality of jobs that work together to reconcile bank account balances, process a batch of sales, provide customer onboarding, perform post trade processing, perform invoicing and billing, or perform other suitable processes. The jobs depicted in FIG. 4 include brief descriptions of functions that the job may perform. In various embodiments, jobs may perform any suitable functions.

A job may be an executable object that carries out processing steps according to software code of the executable object. A job may execute commands on one or more identified target computing systems, in enterprise business solutions (e.g. SAP, PeopleSoft, Siebel, Oracle Applications, etc.), or by other suitable computing apparatuses. Attributes of a job, such as functional logic, may be specified via, e.g., templates or a scripting language of an automation engine. A job may have zero or more input parameters and zero or more output parameters. A job may work together with other jobs within a workflow to form coherent serial and/or parallel sequences. Jobs may be created, edited, and arranged into logical sequences (e.g., via a UI such as 150a-c or via other suitable means). Jobs in a workflow may be related to one or more other jobs in any suitable manner. For example, the results of one or more particular jobs may determine how and/or whether one or more other jobs are executed as part of the workflow. Whether and/or how a job is executed may also be dependent on external conditions (e.g., operator inputs, values of external data, available resources, etc.). In various embodiments, a job may direct a transfer or one or more files, may execute a script, or may perform any other suitable function or combination of functions.

In some embodiments, a workflow may comprise one or more forks. A fork may represent a split of a path of the workflow into multiple paths. A fork may be, e.g., a conditional fork or a parallel fork. A conditional fork may be a point in a workflow (e.g., a point after a job is executed and before an additional job is executed) in which the workflow branches into two or more paths and one or more of these paths may be taken. In many situations, at a conditional fork, only a single path of the multiple paths is taken; in other situations, multiple, but not all, of the paths are taken; in yet other situations, all of the paths are taken, depending on the conditions associated with the fork. The path(s) taken may be dependent on any suitable factors (e.g., one or more output parameters of a job executed before the fork, one or more operating conditions of one or more target computing systems when the fork is reached during execution of the workflow, one or more parameters specified in connection with the workflow prior to execution of the workflow, or other suitable factors). In the embodiment depicted, workflow 400 includes a conditional fork after job 406, in which the workflow may execute either job 408 or job 410. In some situations, both jobs 408 and 410 may be executed in parallel after the conditional fork if the conditions that define execution of both paths are met.

A parallel fork may be a point in a workflow in which the workflow branches into two or more paths and each of the two or more paths are taken in parallel. In the embodiment depicted, workflow 400 includes a parallel fork after job 412. During execution of workflow 400, after job 412 is executed, jobs 414, 416, 418, and 420 are executed in parallel. Workflow 400 also includes a parallel fork after jobs 414, 416, 418, and 420. After all of jobs 414, 416, 418, and 420 complete execution, the workflow forks into a first path including jobs 422 and 424 and a second path including jobs 426 and 428. The jobs on these paths are executed in parallel. Workflow 400 also includes a parallel fork at the very beginning of the workflow 400 where jobs 402 and 404 are executed in parallel and then converge back to job 406.

Jobs (e.g. 402-428) of a workflow (e.g., 400) may be executed by any suitable computing systems. For example, any of the computing devices shown in FIG. 1 as having an agent (e.g., 125a-d) may be target computing systems to execute one or more jobs of a workflow. In some implementations, jobs of a workflow may be distributed among multiple different target computing systems. For example, some jobs of a workflow may be executed by application server 110 and other jobs may be executed by application server 115. In some implementations, all jobs of a workflow may be executed by the same target computing system.

In at least one embodiment, automation engine system 105 may direct one or more computing systems (e.g., 110, 115, 120) to execute the jobs of the workflow. For example, one or more target computing systems under the control of an enterprise may be directed by a work process 205 running on automation engine system 105 to perform a workflow on behalf of the enterprise. In some embodiments, automation engine system 105 itself may execute at least a portion of one or more of the jobs of the workflow. In various embodiments, execution of the workflow may be split between automation engine system 105 and one or more target computing systems (e.g., 110, 115, 120) coupled to automation engine system 105 through a network 130.

Figure 5:
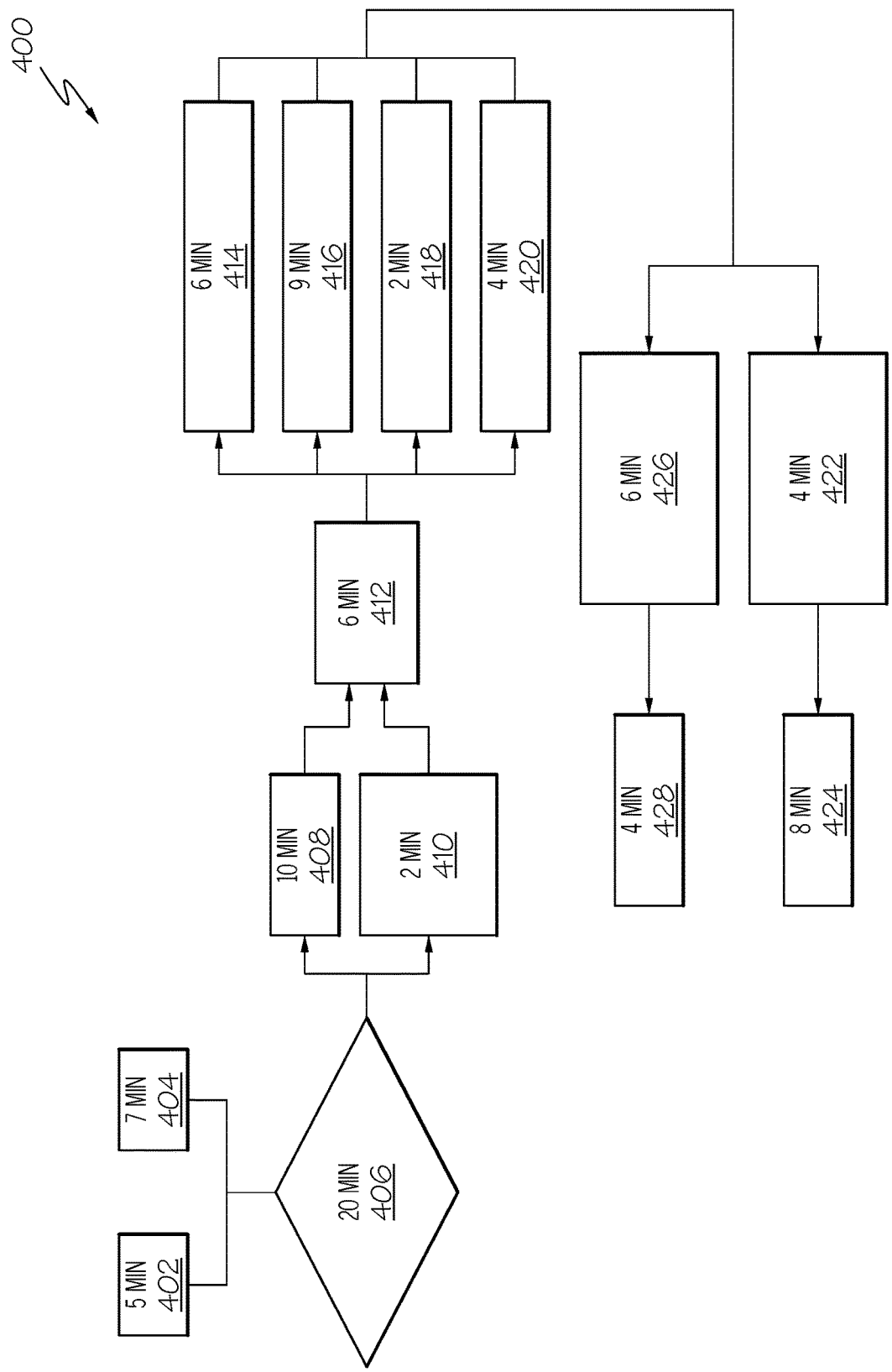
FIG. 5 is a simplified block diagram of predicted runtimes of jobs of the example workflow of FIG. 4 in accordance with at least one embodiment.

FIG. 5 is a simplified block diagram of predicted runtimes of jobs of the example workflow 400 of FIG. 4 in accordance with at least one embodiment. In various embodiments, before the workflow 400 begins execution, a runtime for each job may be estimated. For example, the depicted embodiment shows a runtime of 5 minutes predicted for job 402, a runtime of 7 minutes predicted for job 404, a runtime of 20 minutes predicted for job 406, and so on. Various embodiments describing how these runtimes may be predicted are described below.

Figure 6:
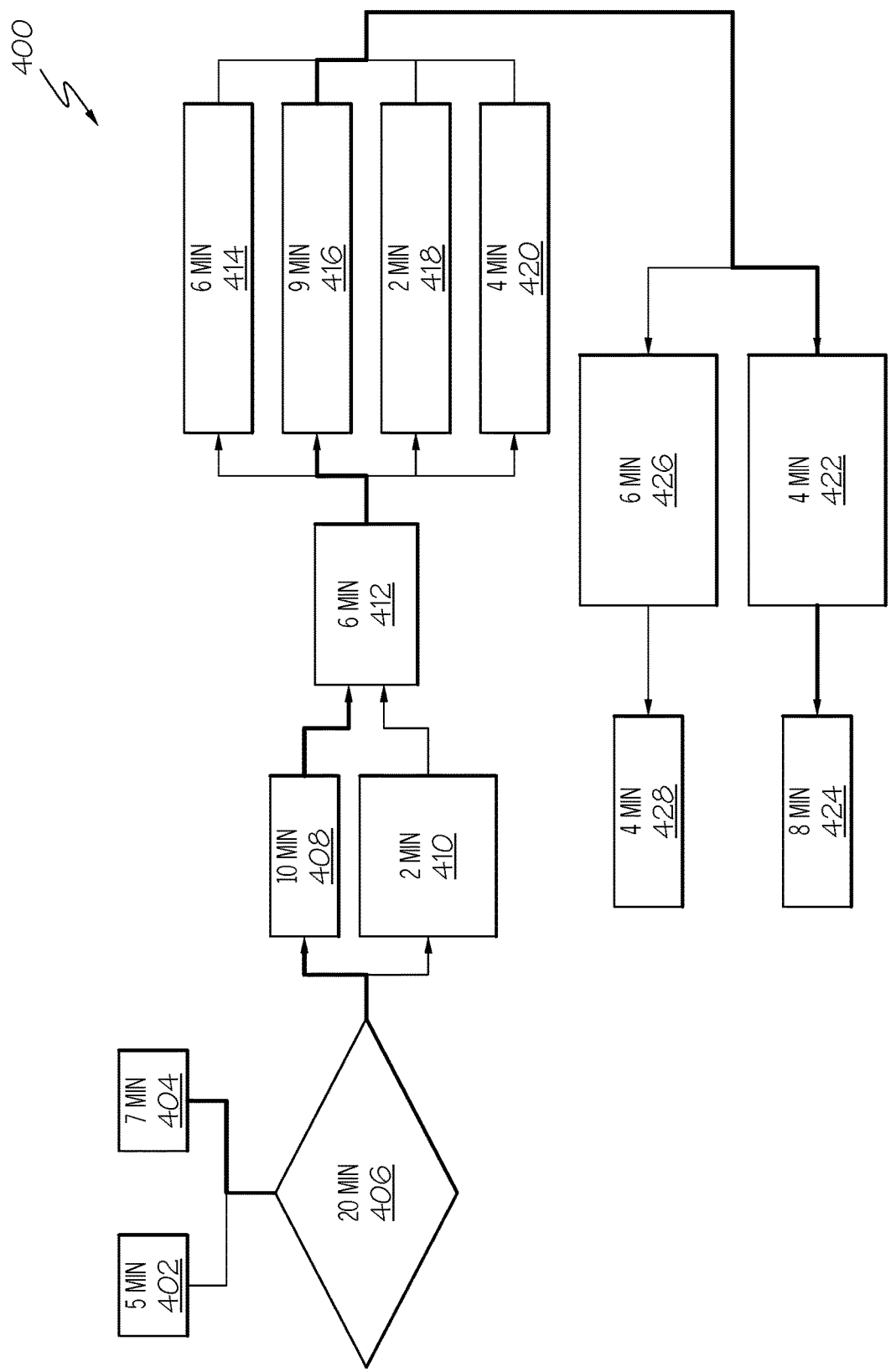
FIG. 6 is a simplified block diagram of a critical path of the example workflow of FIG. 4 in accordance with at least one embodiment.

FIG. 6 is a simplified block diagram of a critical path of the example workflow 400 of FIG. 4 in accordance with at least one embodiment. In the embodiment depicted, the critical path is shown in bold. The critical path includes jobs 404, 406, 408, 412, 416, 422, and 424. In the embodiment depicted, the critical path is selected as the path that is expected to take the longest based on the predicted runtimes of the jobs (thus at each fork, the path with the longest aggregate runtime is selected for inclusion in the critical path). Various embodiments describing how a critical path may be selected are described below.

Figure 7:
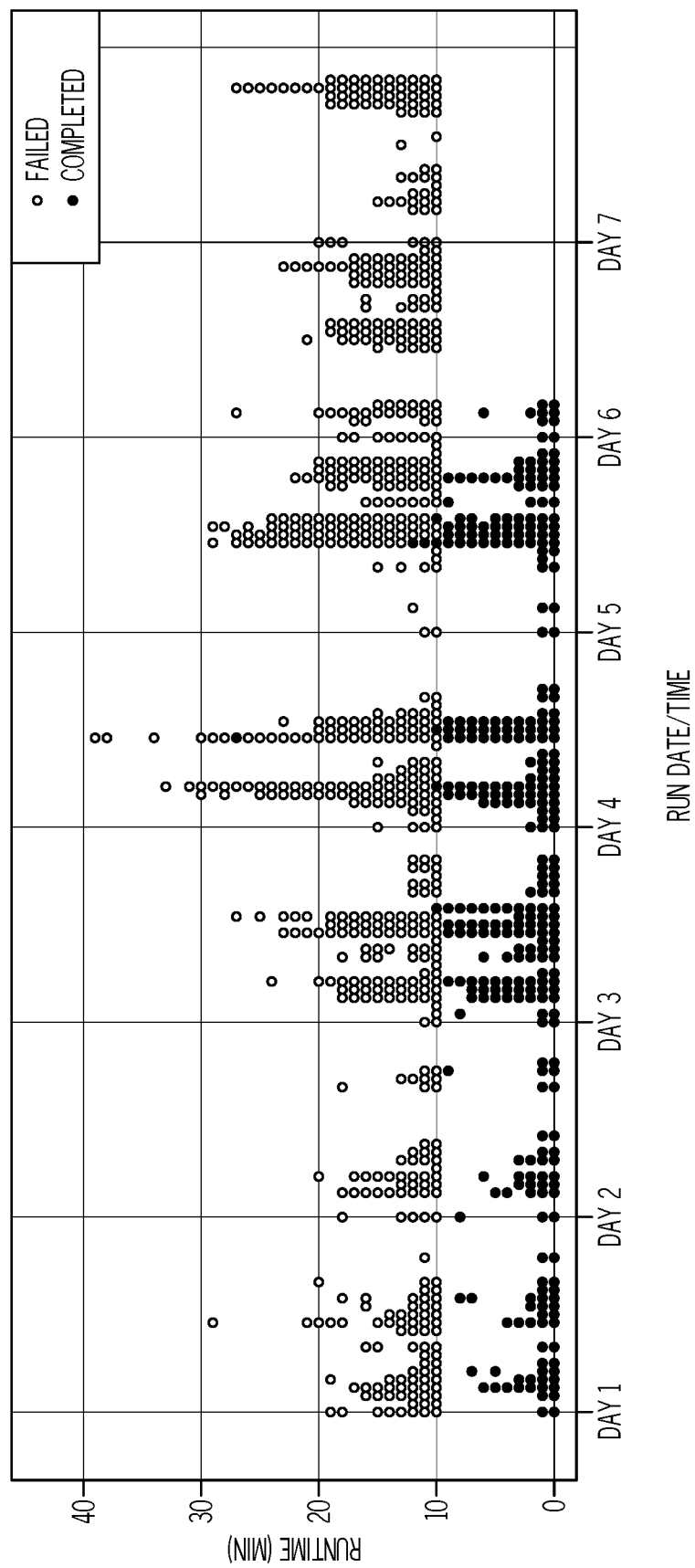
FIG. 7 is an example chart of runtimes of failed executions and completed executions of an example job of a workflow in accordance with at least one embodiment.

FIG. 7 is an example chart of runtimes of failed executions and completed executions of an example job of a workflow in accordance with at least one embodiment. In various embodiments, runtimes of a particular job may be tracked and used to predict a runtime of a future execution of the job. In the embodiment depicted, the runtimes are shown plotted against the date and time in which the job was run. The runtimes are also plotted with reference to whether the job was successfully executed (i.e., completed) or whether the job failed. The recorded runtimes for a particular job, in conjunction with values of features (e.g., date/time, whether completed, etc.) associated with the runtimes, may be utilized in order to predict future runtimes as well as generate failure predictions as will be described in detail below.

Figure 8:
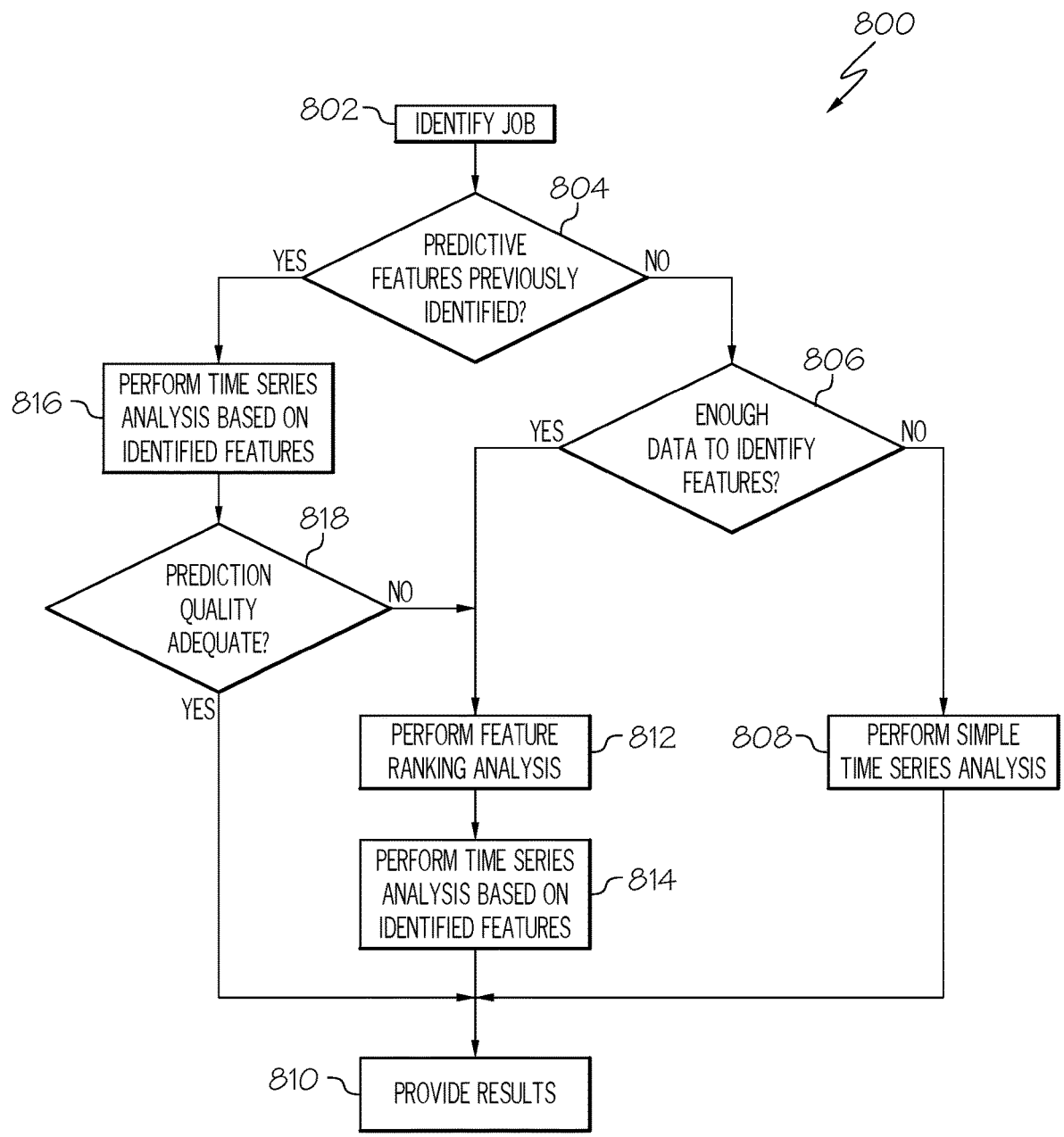
FIG. 8 is an example flow for predicting a runtime for a job in accordance with at least one embodiment.

FIG. 8 is an example flow 800 for predicting a runtime for a job in accordance with at least one embodiment. The flow 800 may be initiated in response to any suitable trigger. For example, flow 800 may start in response to a request for a runtime prediction of the job or in response to a request for a runtime prediction of a workflow to which the job belongs. In some embodiments, flow 800 may start in response to a request to schedule or execute a workflow including the job.

In a particular embodiment, when a request identifying a workflow is received (e.g., any of the requests referenced above), automation engine system 105 may generate a graph of the workflow based on parent/child and/or other relationship information stored in a database (e.g., which may be accessed by automation engine system 105 or other suitable computing system). The graph may enable paths and forks of the workflow to be ascertained.

In various embodiments, a database accessible to the automation engine system 105 may store an indication of the jobs that may be executed as part of the workflow as well as information describing the relationships between the jobs. Automation engine system 105 may then iterate through the graph by identifying a job and executing operations of flow 800, then identifying the next job and executing operations of flow 800, and so on. In some embodiments, the operations of flow 800 may be performed for each job of the workflow prior to the graph of the workflow being generated. In various embodiments, the graph of the workflow may be cached by the automation engine system, so that the next time a request identifying the workflow is received, the graph does not need to be rebuilt and may simply be accessed from the cache.

The operations described herein with respect to flow 800 may be performed by any suitable computing system (e.g., by executing program code using a data processing apparatus). In one embodiment, automation engine system 105 may perform the operations associated with flow 800. In a particular embodiment, feature ranker 227 and runtime predictor 229 may operate on runtime data sets 242 to perform various operations of flow 800.

At 802, a job is identified. The job may be part of a workflow. At 804, a determination is made as to whether predictive features (i.e., features that are predictive of a runtime of the job) have been previously identified (e.g., by feature ranker 227). For example, this operation may involve determining whether features associated with the job have been ranked based on their predictive value on the runtime of the job. If predictive features have not been identified, a determination is made at 806 as to whether enough data exists to identify predictive features for the runtime. For example, this operation may include a determination of whether a threshold number of data sets (each specifying a run time of the job) are available for analysis. As another example, this operation may include a determination of whether there is enough variety among the feature values of the data sets associated with the particular job to identify features predictive of the runtime (for example, if all of the executions of a particular job each have the same feature values, it may be difficult to isolate the features that have predictive value for the runtime).

If enough data is not available to identify features at 806, then a simple time series analysis is performed at 808. For example, a time series analysis may be performed using the runtimes from all of the data sets associated with the particular job. As another example, a time series analysis may be performed after filtering the data sets based on one or more default feature values that are typically highly predictive of runtime of jobs in general (e.g., operating system upon which the instances of the job were executed).

A time series may be a series of data points (e.g., runtimes) indexed, listed, or graphed according to time order. A time series analysis may utilize a model to predict a future runtime of the job based on previously observed runtimes. Any suitable time series model may be utilized for the time series analyses discussed herein. As various non-limiting examples, an AutoRegressive Moving Average (ARMA) model, AutoRegressive Integrated Moving Average (ARIMA) model, or a Seasonal AutoRegressive Integrated Moving Average with eXogenous regressors (SARIMAX) model may be used to predict the runtime of the job. In various embodiments, the particular model used for the time series analysis may be trained using the runtimes of the data sets associated with the job and then may be used to predict a future runtime of the job.

An ARMA model may include two portions, an autoregressive (AR) portion and a moving average (MA) portion. The AR portion may regress the variable (e.g., runtime) on its own past values. The MA part may model an error term as a linear combination of error terms occurring contemporaneously and at various times in the past. An ARIMA model may constitute a generalization of an ARMA model. In an ARIMA model, data values may be replaced with the difference between their values and the previous values (and this differencing process may be performed one or more times). A SARIMAX model may add seasonality (which captures larger trends in the data that happen at larger time scales) and the modeling of exogenous variables to the ARIMA model.

For any specific model used for the time series, the parameters used may be determined in any suitable manner. For example, the model parameters may be determined using a grid search method. For example, in the case of the ARIMA model, the model order parameters, p, d, and q may be determined by using the grid search method. In one method, the Akaike information criterion (AIC) may be calculated for a specified vector of p,d,q parameters, and various iterations of vectors with distinct p, d, and q parameter values may be performed until a minimum AIC value is found. Vectors of p, d, and q values may be created using permutation to generate all three digit combinations across a specified range of values. If no suitable fit can be determined, techniques to make the data stationary (e.g., differencing) may be applied.

The input into the time series analysis may include a series of runtimes. The output of the time series analysis may comprise a predicted runtime (also referred to as a forecast). The time series analysis may also output one or more parameters associated with the predicted runtime. For example, the time series analysis may output one or more confidence intervals and/or a prediction error. In some embodiments, the input into the time series analysis may comprise one or more parameters that may affect the predicted runtime. For example, a performance metric of a target computing system for the workflow may be used in the time series analysis (where increased performance at the target computing system may result in a reduced predicted runtime).

A confidence interval may represent the quality of the prediction. A confidence interval may indicate a range of values for the runtime such that there is a specified probability that the actual runtime will lie within the range. For example, a confidence interval may specify at least one of an upper bound and a lower bound for the runtime. As just one example, the confidence interval for a predicted runtime of 10 minutes may be plus or minus 1 minute (of course the confidence interval is specific to the particular data set used to predict the runtime and depends on the variance of the runtimes in the data set). The confidence interval may be associated with any suitable probability, such as 95%, 99%, 99.9%, etc. In various embodiments, the probability for the confidence interval may be user configurable (e.g., via a UI).

A prediction error may represent the quality of past predictions, with a higher prediction error representing worse predictions. The prediction error may be calculated in any suitable manner. In one embodiment, the prediction error may be a root mean square error (RMSE) calculated using differences between runtimes predicted by a model (e.g., predicted runtimes for past runtimes of the job) and the corresponding actual runtimes when the job was executed (in some embodiments, each runtime data set 242 may include a predicted runtime for an execution of a particular job as well as a runtime that was predicted for the job prior to execution of the job (or a prediction error indicating the difference between the predicted runtime and actual runtime)). In other embodiments, the prediction error may be a mean absolute percentage error (MAPE), mean absolute error (MAE), mean squared error (MSE), or other suitable error estimate utilizing previous predicted runtimes and actual runtimes of the job.

After the simple time series analysis is performed at 808, results may be provided at 810. The results may include any suitable output parameters of the time series analysis, such as a predicted runtime for the job and optionally a confidence interval and/or a prediction error associated with the predicted runtime.

At 806, if it is determined that enough data is available to identify features, then a feature ranking analysis is performed at 812. As described above, a runtime data set 242 may include a runtime for a past execution of a job as well as feature values associated with the execution of the job (e.g., conditions under which the job was executed). Runtime data sets 242 may include a plurality of runtime data sets for a particular job (in some embodiments, each time a job is executed, a runtime data set 242 may be generated for that job). The various jobs of one or more workflows may each be associated with one or more runtime data sets 242 that each include data associated with an execution of the respective job.

In some embodiments, multiple runtime data sets for a particular job may be aggregated into a single physical record or otherwise compressed. For example, if multiple data sets have many feature values that are the same across different executions of the job, these feature values may be stored once (while feature values that differ and/or the runtimes may each be stored separately). In other embodiments, the runtime data sets may be stored in any suitable manner.

The feature ranking analysis may utilize a plurality of runtime data sets 242 associated with the job to generate a ranking of features with respect to their predictive value on a runtime of the job. The feature ranking analysis may analyze various features having feature values recorded in the runtime data sets to see how much each feature contributes to the variance of the runtime of the job.

In one embodiment, a feature ranking analysis may comprise an execution of a plurality of feature weighting analyses. A feature weighting analysis may determine a relative effect of one or more features or feature values on the runtime of the job. The results of a plurality of feature weighting analyses may be utilized (e.g., averaged or otherwise considered together) to rank a plurality of features with respect to their predictive value on the runtime of the job (e.g., by analyzing various features' effect on the variance of the runtime). In one embodiment, the features may be ranked from most predictive to least predictive. In another embodiment, the features may be ranked by separating the features into a set of features that is predictive of the runtime of the job and a set of features that is not predictive of the runtime of the job. In yet another embodiment, the features may be ranked by separating the features into a set of features that have predictive values for the runtime that are above or equal to a threshold and a set of features that have predictive values lower than the threshold.

In a particular embodiment, a feature weighting analysis may comprise a decision tree analysis. In one example, a decision tree analysis may compare two or more features to determine each features' relative influence on the runtime of the job. The decision trees may enable determination of predictive features (or combinations thereof).

In various embodiments, the feature weighting analysis may comprise usage of a random forest decision tree model to rank the features. In a random forest decision tree model, the features may be weighted (or in some embodiments may be given the same weight) and combined in various different orders. The random forest decision tree model may output a feature weight (also referred to as a "feature importance") for each analyzed feature. A random forest decision tree model may average multiple deep decision trees, trained on different parts of the same training set (i.e., a collection of runtime data sets for the particular job), in order to reduce variance. Random forests may operate by constructing a multitude of decision trees at training time. In general, random forests may be used to rank the importance of features in a regression or classification problem. In a particular, the classifiers used in the random forest (or other decision tree) analysis to determine the feature importances for the runtime prediction are partitions of runtime ranges. For example, a first classifier may comprise a runtime between 0 and 2 min, a second classifier may comprise a runtime between 2 and 4 min, and so on.

In some embodiments, the feature ranking analysis begins by fitting a random forest to the data sets of a job. During the fitting, an out-of-bag error for each data point is recorded and averaged over the forest (in some embodiments errors on an independent test set can be substituted if bagging is not used during training). To measure the importance of a feature after training, the values of the feature may be permuted among the training data and the out-of-bag error may again be computed on this perturbed data set. The importance score for a feature may be computed by averaging the difference in out-of-bag error before and after the permutation over all trees. This score may be normalized by the standard deviation of these differences. Features which produce large values for this score are ranked as more important than features which produce small values. As there are multiple ways to perform a random forest decision tree analysis, the present disclosure contemplates any suitable modification of the above.

A random forest (or random decision forest) is a subclass of the general class of decision tree algorithms. In other embodiments, any suitable decision tree algorithms may be utilized to perform the feature ranking analysis. For example, a Tree Bagging or ExtraTrees (extremely randomized trees) algorithm may be adapted and used to rank the features of the data sets of a particular job.

For decision tree models, hyperparameters may be specified based on the characteristics of the data. For example, hyperparameters adjusted for the data sets may include the number of search trees, maximum depth of a search tree, and minimum number of samples required to split a node. In a particular embodiment, these parameters may be determined using a grid search method. This method specifies a matrix of possible parameter values, and iterates over the parameter value matrix. The parameter values with the best classification performance are the parameters may be selected for further testing.

In various embodiments, feature values may be partitioned for the feature ranking analysis. For example, feature values representing time may be partitioned into ranges of time. For example, during the feature ranking analysis the data sets may be grouped into a first set of data sets with execution start times in the morning, a second set of data sets with execution start times in the afternoon, and a third set of data sets with execution start times in the evening (thus each execution start time in the morning is treated as being the same feature value). As another example, the feature values indicating time may be partitioned into one hour blocks, four hour blocks, or other blocks of any suitable length of time.

In some embodiments, the features that are identified as predictive of the runtime may vary from job to job (as each job has its own runtime data sets). For example, for a first job, a first set of features may be predictive of the runtime of the first job, while for a second job, a second set of features (that has at least one feature that differs from the first set of features) may be predictive of the runtime of the second job.

After the feature ranking analysis is performed at 812, a time series analysis may be performed at 814 based on the identified features. This operation may include identifying a plurality of runtime data sets (referred to herein as a "bin" of runtime data sets) that are to be used in the time series analysis. The predictive features identified during the feature ranking analysis may be used, in conjunction with expected feature values for the execution of the job, to filter the runtime data sets for the job. For each identified feature, the data sets having feature values that do not equal the expected feature value for the execution of the job may be excluded from the data set used for the time series analysis. For example, if time of day, day of week, and operating system are identified as features predictive of the runtime for a particular job, and the job is expected to be executed on Monday morning on a Linux operating system, only the runtime data sets that specify feature values of morning, Monday, and Linux operating system for time of day, day of week, and operating system respectively are used in the time series analysis.

As described above, some of the features tested during the feature ranking analysis 812 may be determined not to have predictive weight (or not to have sufficient predictive weight) and thus are not used to filter the bin of data for the time series analysis (thus these features are ignored during the filtering of the runtime data sets since variance among the feature values for this feature is not expected to appreciably affect the runtime). In some embodiments, features identified as predictive may only be used for the filtering if they have a feature weight above a particular threshold. In various embodiments, all features identified as predictive (e.g., having a positive feature weight) may be used to select the bin of data for the time series analysis.

Once the bin of runtime data sets to be used is selected based on the identified features, a time series analysis is performed using the runtimes of the runtime data sets of the bin. The time series analysis is used to generate a predicted runtime for the job. In various embodiments, one or more other parameters (e.g., a prediction error and/or a confidence interval) may also be generated during the time series analysis. These other parameters may also be generated using the filtered bin of runtime data sets based on the identified features. For example, the prediction error may be calculated using the runtimes and previously predicted runtimes of the runtime data sets in the bin. The time series analysis may be performed in any suitable manner and may have any of the features of the time series analysis described above with respect to operation 808. The results of the time series analysis are then provided at 810.

Returning to operation 804, if it is determined that one or more predictive features have been previously identified, the flow moves to 816 where a times series analysis is performed based on the identified features. Operation 816 may include performing any of the functions described above with respect to 814 or 808.

At 818, a determination is made as to whether a quality of a runtime prediction produced by the time series analysis performed at 816 is adequate. This determination may be made in any suitable manner. In one example, a prediction error corresponding to the runtime prediction determined at 816 may be compared against an error threshold. If the prediction error is greater than the threshold, the prediction quality may be deemed inadequate. When the prediction quality is inadequate, the flow may move to 812 to perform an updated feature ranking analysis and then to 814 to predict a runtime based on the results of 812 and the relevant expected feature values for the execution of the job. If the prediction quality is adequate, the flow may move to 810, where the results of the time series analysis are provided.

Although not shown, after 814, in some embodiments, a determination may be made as to whether the prediction quality of the prediction made at 814 is adequate and if it is not, the flow may move to 808 for performance of a simple time series analysis. In some embodiments, both the simple time series analysis and the time series analysis based on identified predictive features may be performed and the prediction associated with the lowest prediction error may be selected for provision at 810.

In some embodiments, the feature ranking analysis may be performed each time a runtime prediction is made, regardless of whether predictive features have been previously identified, so that the time series analysis may be performed on the most recent data (e.g., to combat against model drift).

Figure 9:
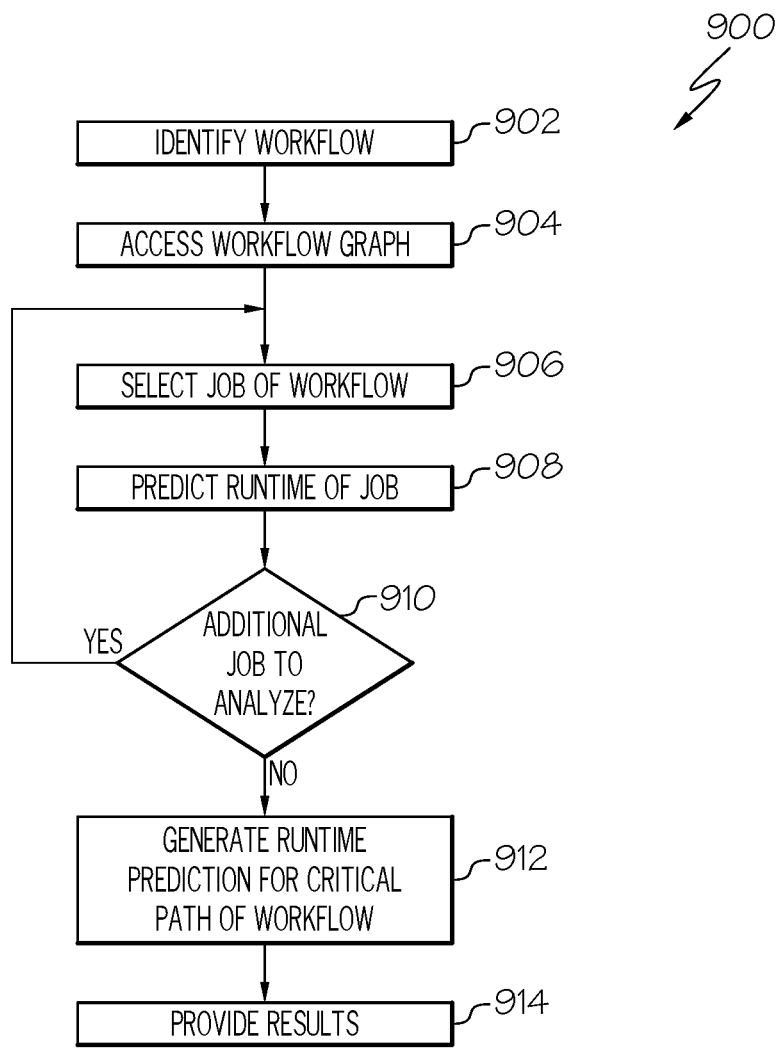
FIG. 9 is an example flow for predicting a runtime for a critical path of a workflow in accordance with at least one embodiment.

FIG. 9 is an example flow 900 for predicting a runtime for a critical path of a workflow in accordance with at least one embodiment. The operations described herein with respect to flow 900 may be performed by any suitable computing system (e.g., by executing program code using a data processing apparatus). In one embodiment, automation engine system 105 may perform the operations associated with flow 900. In a particular embodiment, feature ranker 227 and runtime predictor 229 may operate on runtime data sets 242 to perform various operations of flow 900.

At 902, a workflow is identified. At 904, a workflow graph is accessed. In a particular embodiment, a memory may be checked to determine whether a graph for the identified workflow has been previously generated. If the graph has been previously generated, the graph is retrieved from the memory. If the graph has not been previously generated (or a change has been made to the workflow that could affect the graph), a graph of the workflow is generated. The graph may include information about the relationships between the jobs of the workflow. The graph may indicate various forks in the workflow and the various possible paths through the jobs of the workflow (where a path is a sequence of execution for one or more jobs).

At 906, a job of the workflow is selected. As the jobs are iterated through in workflow 900, the jobs may be selected in any suitable order. In one example, the jobs may be selected in order of execution sequence within the workflow. In another example, the jobs may be selected in order of job IDs (where each job is associated with a unique job ID). At 908, a runtime of the job is predicted. The prediction of the job runtime may be performed in any suitable manner (e.g., any of the methods described with respect to flow 800 or elsewhere herein may be used to predict the runtime). In various embodiments, other statistics associated with the runtime of the job may also be generated (e.g., a prediction error and/or a confidence interval).

At 910, a determination is made as to whether an additional job is to be analyzed. In one embodiment, all of the jobs of the workflow are to be analyzed and have runtime predictions generated. In another embodiment, one or more jobs may be omitted (e.g., a job could have a runtime that does not vary by an appreciable amount regardless of execution conditions and thus runtime prediction for this particular job may be omitted). If an additional job is to be analyzed, the flow moves to 906 where the next job is selected and a runtime prediction is performed for that job. If no additional jobs are to be analyzed, the flow moves to 912.

At 912, a runtime prediction is generated for a critical path of the workflow. A critical path of the workflow may be a path comprising a plurality of jobs in a sequence in the workflow. In at least some embodiments, the critical path spans from the start of the workflow to the end of the workflow. In various embodiments, the first job and last job of a workflow may vary depending on execution conditions and/or results, and the determined critical path at 912 is not necessarily equal to the actual critical path (i.e., the path through the workflow with the longest execution time) at execution of the workflow. For example, a workflow may have multiple possible starting points and/or multiple possible ending points. In some situations, the critical path determined at 912 ends up being the actual critical path at execution of the workflow.

Any suitable methods may be used to determine the critical path and to generate the runtime prediction for the critical path of the workflow at 912. As one example, the critical path is selected as the longest estimated path from a starting point of the workflow to an ending point of the workflow. In another example, the critical path is selected as the most likely path from a starting point of the workflow to an ending point of the workflow. In yet another example, the critical path is a combination of most likely paths and longest paths from a starting point of the workflow to an ending point of the workflow. Various embodiments may be able to select the critical path using one or more of the above examples or using other suitable techniques.

The runtime prediction for the critical path of the workflow may be determined in any suitable manner. In one embodiment, the runtime prediction for the critical path of the workflow is the sum of the predicted runtimes of the individual jobs that form the critical path. In another embodiment, the runtime prediction for the critical path may take into account any other suitable factors (e.g., the runtime prediction for the critical path may be based on a likelihood that a particular path is taken or a confidence interval of a particular predicted runtime for a job). In various embodiments, additional statistics associated with the runtime prediction for the critical path may be generated. For example, a prediction error and/or confidence interval may be generated for the critical path runtime prediction (e.g., the prediction error and/or confidence interval may be a function of the prediction errors and/or confidence intervals of the individual jobs within the critical path).

At 914, the results of the critical path runtime prediction are provided. These results may include the results for the critical path runtime estimation. Optionally, the results may also or alternatively include the runtime estimations for the individual jobs of the workflow. The results may be provided to any suitable component of automation engine system 105 or other computing system (e.g., to be viewed by an enterprise or a user associated with the workflow). Any suitable actions may be performed (e.g., by the automation engine system 105 or by a target computing system) based on the critical path runtime prediction. In one embodiment, the results may be used to automate scheduling of the execution of the workflow. For example, if a runtime prediction for a critical path of a workflow is 2 hours and the workflow needs to be completed by 10:00 AM on a particular day to free up the target computing system for another task, the workflow may be automatically scheduled for 8:00 AM or earlier (if a buffer is desired). In some embodiments, the start time of the workflow may be based on the runtime prediction for the critical path as well as a prediction error and/or confidence interval associated with the critical path runtime prediction (e.g., if the prediction error is relatively high, a greater buffer may be added to increase the likelihood that the workflow will finish execution on time). As another example, the runtime prediction may be used to estimate a cost of executing the workflow (e.g., when the cost of the workflow is based on a runtime of a target computing system). As another example, the runtime predictions of the workflow and/or individual jobs may be stored to assess and improve the accuracy of the runtime predictor 229 or to facilitate calculation of prediction errors for future predictions for the workflow or jobs. As yet another example, the runtime predictions may be stored to allow monitoring of the actual runtime of the workflow (or individual jobs) vs. the predicted runtime of the workflow (or individual jobs) and to communicate deviations or take any other suitable actions based on the predicted and monitored runtimes.

Figure 10:
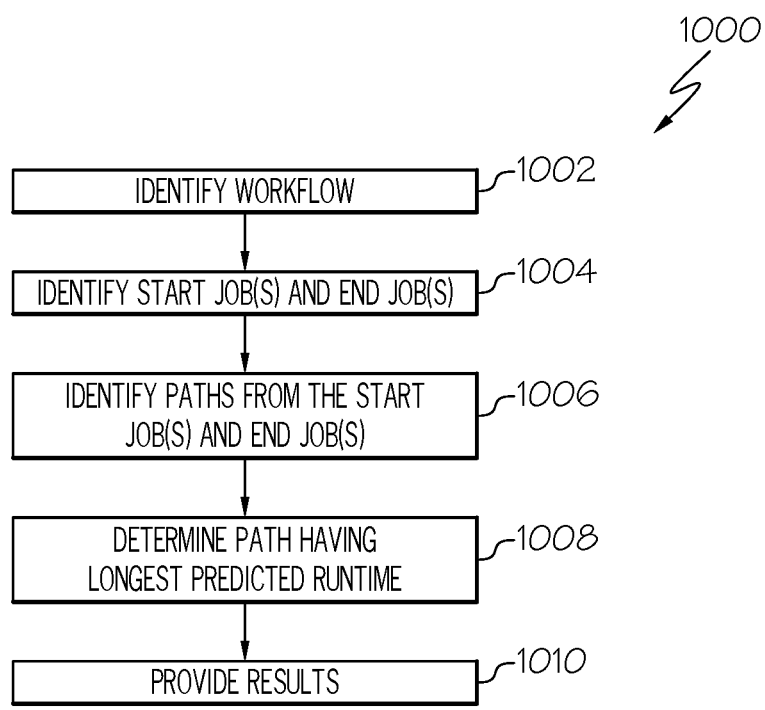
FIG. 10 is an example flow for determining a critical path of a workflow in accordance with at least one embodiment.

FIG. 10 is an example flow 1000 for determining a critical path of a workflow in accordance with at least one embodiment. The operations described herein with respect to flow 1000 may be performed by any suitable computing system (e.g., by executing program code using a data processing apparatus). In one embodiment, automation engine system 105 may perform the operations associated with flow 1000. In a particular embodiment, runtime predictor 229 may perform the operations of flow 1000.

At 1002, a workflow is identified. At 1004, one or more start jobs and one or more end jobs are identified. A start job may be a job which may be executed first when the execution of the workflow begins. In some situations, a workflow may have multiple possible start jobs. For example, referring to workflow 400 of FIG. 4, the workflow includes two jobs (402 and 404) that may each be considered a start job. When workflow 400 begins execution, both FTPs 402 and Exports 404 begin execution in parallel. Other workflows may have multiple start jobs, one or more of which may be the first to execute based on operating conditions or parameters associated with the workflow. Similarly, in some situations, a workflow may have multiple possible end jobs. For example, referring to workflow 400 of FIG. 4, either of jobs 424 or 428 may be the last job to finish execution (depending on how quickly jobs 422, 424, 426, and 428 take to execute). In some situations, jobs 424 and 428 may execute in parallel. In some situations, a workflow may have multiple end jobs of which one or more of the end jobs may be last job to be executed based on operating conditions or parameters associated with the workflow. For example, during execution of the workflow, a particular path may be taken at a conditional fork to the exclusion of the other path. However, prior to the actual execution of the workflow, it may not be possible to ascertain which path will be executed, and thus the paths to multiple end jobs may be analyzed during determination of the critical path.

At 1006, paths based on the start job(s) and the end job(s) are identified. In various embodiments, the paths may be identified based on a graph of the workflow, wherein the graph indicates relationships between the jobs of the workflow and the order in which jobs are to be executed. Depending on the workflow, any suitable number of paths may be identified. In a particular embodiment, all end-to-end paths may be identified. An end-to-end path comprises a path from a start job to an end job. For example, a first end-to-end path of workflow 400 may include jobs 402, 406, 408, 412, 414, 426, and 428. As another example, a second end-to-end path of workflow 400 may include jobs 404, 406, 408, 412, 418, 422, and 424. Various other end-to-end paths exist in workflow 400.

At 1008, a path having the longest predicted runtime is determined. In one example, the predicted runtimes of the jobs of each end-to-end path are aggregated to determine the predicted runtime of the respective end-to-end path and the end-to-end path having the longest aggregate runtime is determined to be the critical path. In another example, the predicted runtime of each end-to-end path may be based on the predicted runtimes of the jobs and prediction errors and/or confidence intervals associated with those predicted runtimes. For example, the sum of the predicted runtimes of the jobs may be adjusted based on prediction errors and/or confidence intervals of the predicted runtimes to determine the predicted runtime of the end-to-end path (e.g., with larger prediction errors or confidence intervals resulting in larger predicted runtimes).

In some embodiments, rather than identifying entire end-to-end paths, forks and converging points in the workflow may be utilized to reduce the length of the paths that are to be analyzed. For example, paths between forks and converging points (e.g., a point where two or more separate paths converge to a single point) in the workflow may be identified. For example, there are two possible paths leading to the converging point before job 406 (i.e., one path through job 402 and one path through job 404), two possible paths from the condition fork after job 406 to the converging point prior to job 412 (i.e., one path through 408 and one path through 410), four possible paths from the parallel fork after job 412 to the converging point after jobs 414, 416, 418, and 420 (each path through one of the jobs 414, 416, 418, or 420), and two possible paths from the parallel fork prior to jobs 422 and 426 (i.e., one path through jobs 422 and 424 and one path through jobs 426 and 428).

Instead of comparing end-to-end paths against each other, the individual paths between a fork and a converging point may be compared against each other and one of the paths may be selected for inclusion within the actual critical path (e.g., based on results of operation 1008). As an example, referring to FIG. 6, the critical path analysis may begin by comparing job 402 against 404. Because job 404 has a longer predicted runtime, it is selected for inclusion in the critical path. Job 406 is selected for the critical path because it is the only path to the next fork prior to jobs 408 and 410. The predicted runtimes of jobs 408 and 410 are compared and the job with the longer runtime (i.e., job 408) is selected for the critical path. Job 412 is selected for the critical path because it is in the only path to the next fork prior to jobs 414, 416, 418, and 420. The predicted runtimes of jobs 414, 416, 418, and 420 are compared and the job with the longest runtime (i.e., job 416) is selected for the critical path. After this, the path with the longest predicted runtime from the parallel fork prior to jobs 422 and 426 and to the next convergence point (in this case, the end of the execution of the workflow) is selected for the critical path. In the depicted embodiment, this is the path through jobs 422 and 424 which has an aggregate predicted runtime of 12 min compared to the aggregate predicted runtime of 10 min for the path through jobs 426 and 428.

Thus, in a particular embodiment, the longest predicted path through a workflow may be selected as the critical path through the workflow. In some embodiments, this critical path may be selected regardless of the likelihood of a particular path being taken at a conditional fork. In other embodiments, this critical path (or segments of the critical path) may be selected in this manner when the system does not have enough data to determine the likelihood that a particular path will be taken at a conditional fork. In general, selecting the longest predicted path as the critical path of a workflow provides a relatively conservative estimate of the runtime of a workflow.

At 1010, the results of flow 1000 are provided. For example, the predicted runtime of the critical path through the workflow may be provided. In some embodiments, one or more statistics associated with the predicted runtime (e.g., a prediction error or confidence interval) may also be provided. In various embodiments, operation 1010 may have any one or more features of operation 914.

Figure 11:
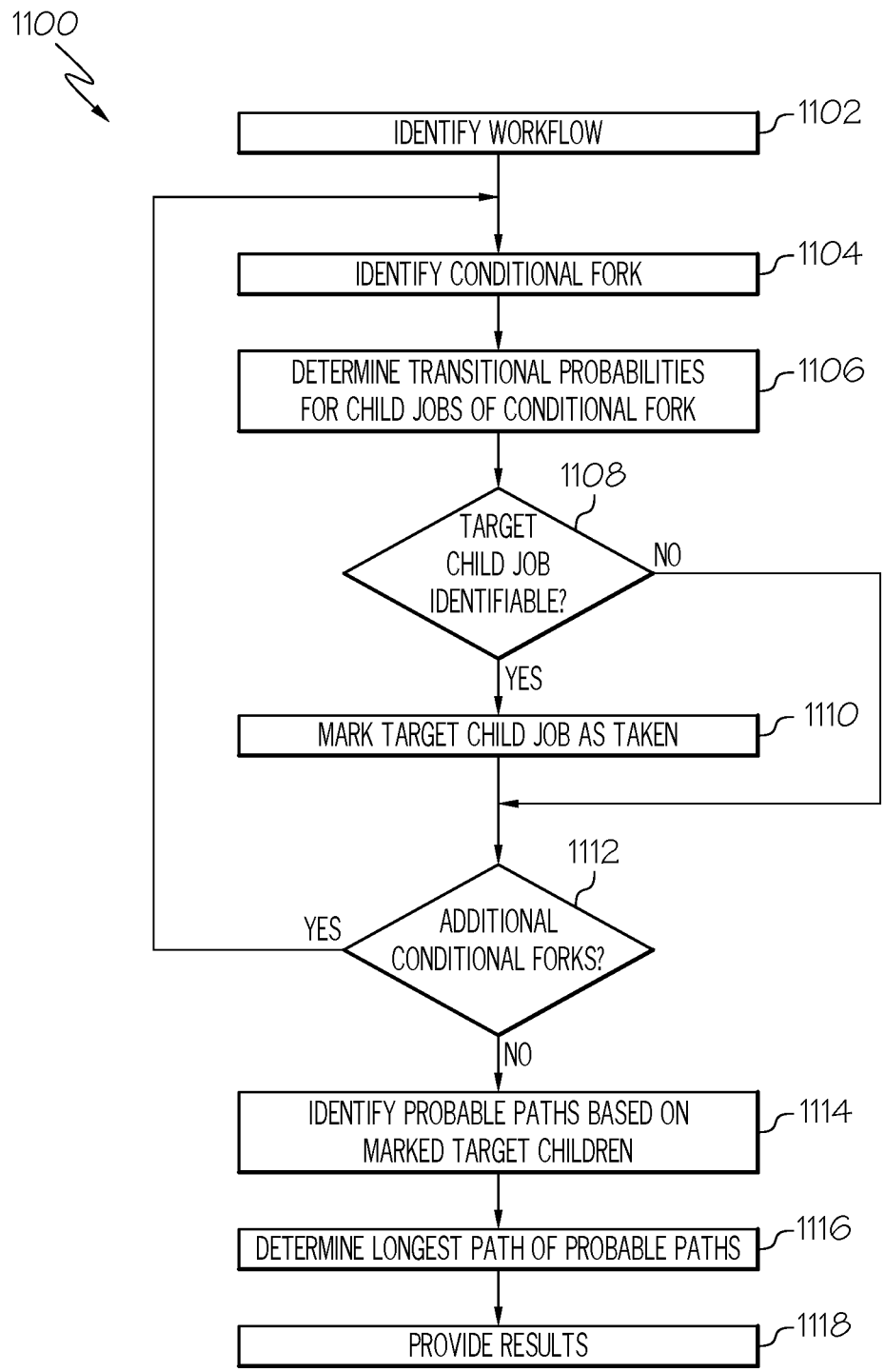
FIG. 11 is an example flow for determining a critical path of a workflow based on transitional probabilities in accordance with at least one embodiment.

FIG. 11 is an example flow 1100 for determining a critical path of a workflow based on transitional probabilities in accordance with at least one embodiment. The operations described herein with respect to flow 1100 may be performed by any suitable computing system (e.g., by executing program code using a data processing apparatus). In one embodiment, automation engine system 105 may perform the operations associated with flow 1100. In a particular embodiment, runtime predictor 229 may perform the operations of flow 1100.

At 1102, a workflow is identified. At 1104, a conditional fork of the workflow is identified. The conditional fork may be identified in any suitable manner. In some embodiments, a graph of the workflow may be accessed to identify the conditional fork.

At 1106, transitional probabilities for child jobs of the conditional fork are determined. A child job of a conditional fork is a job that may be executed after the conditional fork. For example, in FIG. 4, jobs 408 and 410 are each child jobs of the conditional fork after job 406. A transitional probability for a child job is a likelihood that the path including the child job is taken at the conditional fork. For example, the path with job 408 may have a 75% chance of being taken, while the path with job 410 may have a 25% chance of being taken.

In a particular embodiment, in order to determine transitional probabilities for child jobs of a particular conditional fork of a workflow, a plurality of data sets comprising indications of which path was taken for the conditional fork may be accessed. Each data set may include an indication of which path was taken during a particular execution of the workflow. In some embodiments, these data sets may also each include feature values for a plurality of features associated with the respective execution of the workflow. In one embodiment, such data sets may be runtime data sets for the parent job of a conditional fork (i.e., the job executed prior to the conditional fork). In other embodiments, these data sets may be separate from the runtime data sets.

A transitional probability for a child job may be determined as the percentage of times the path including the child job was taken as represented in the data sets. For example, is a particular path with a first child job was taken 79 times out of 100 executions as indicated by the data sets, the transitional probability for the first child job may be 0.79.

In some embodiments, the data sets that are used to determine the transitional probabilities for a particular conditional fork may be filtered prior to determination of the transitional probabilities. For example, the features having feature values in the data sets may be analyzed to determine which features are predictive of the path that is taken. In a manner similar to that described above with respect to job runtime prediction, a feature ranking analysis may be performed. In one embodiment, this feature ranking analysis may be a decision tree analysis, such as a random forest decision tree analysis, although in other embodiments, any suitable feature ranking analysis may be used to determine which features have predictive effect for the path taken at the conditional fork. In contrast to the decision tree analysis described above with respect to the runtime prediction (where the classifiers were partitions of runtimes), the classifiers used in the conditional fork analysis would be the child jobs of the conditional fork. Once the predictive features have been identified, the data sets may be filtered based on the identified features and the expected feature values for the execution of the workflow (in a manner similar to that described above with respect to the data filtered for the time series analysis). The remaining data sets may then be analyzed to determine how likely it is that each path is taken in order to determine the transitional probabilities for the child jobs of the conditional fork. In various embodiments, a prediction error associated with the transitional probabilities may be determined. As one example, if a conditional fork has only two child jobs, then the significance level of the observed probability may be calculated as the error function of a Bernoulli process. As another example, if a conditional fork has more than two child jobs, the prediction error may be calculated using statistical hypothesis testing or confirmatory data analysis, where the probability of a branch is related to a calculated p-value (or probability value), which accepts or rejects the probability of the given result as being significant. In various embodiments, significance may be defined by a predetermined alpha value, such as 0.01.

At 1108, a determination is made as to whether a target child job is identifiable. A target child job is a child job that is predicted to be on the path taken from the conditional fork with a reasonable degree of certainty. Thus, even if the path including a first child job is more likely to be taken than a different path including a second child job, the first child job may not be identifiable as the target child job in some situations. For example, the number of samples used to determine the transitional probability may be low and thus the prediction error associated with the transitional probabilities determined may be relatively high. Accordingly, a high amount of uncertainty may exist as to which path will be taken at the conditional fork. As another example, the differences in the transitional probabilities between two forks may be relatively low (for example, the transitional probability for a first child job may be 51% while the transitional probability for a second child job is 49%), thus a selection of the first child job as the target child job may lead to an erroneous calculation for the predicted runtime of the critical path through the workflow in many instances.

In a particular embodiment, a target child job is not identifiable if the prediction error associated with the transitional probabilities of the child jobs is higher than a threshold value. In some embodiments, a target child job is not identifiable unless the difference in the transitional probability for the most likely child job and the probability for the next most likely child job is greater than a threshold amount. In yet another embodiment, a target child job is not identifiable unless the transitional probability for the most likely child job is greater than a threshold amount. In other embodiments, other suitable criteria may be used to determine whether a target child job is identifiable. If the criteria for identifying a target child job is met, then the most likely child job, as indicated by the transitional probabilities, is selected as the target child job.

If a target child job is identifiable at 1108, the target child job may be marked as taken at 1110. In other words, the target child job may be marked for inclusion within the critical path of the workflow (such that the path including the target child job is included in the critical path). If a target child job is not identifiable at 1108, then no target child job is marked as taken and the flow moves to 1112.

At 1112, a determination is made as to whether additional conditional forks of the workflow are to be analyzed. If so, the flow returns to 1104 and transitional probabilities for child jobs of the next conditional fork are determined and a target child job is potentially identified. If no additional conditional forks are to be analyzed, the flow moves to 1114 where probable paths through the workflow are identified based on one or more marked target children. As the probable paths through the workflow are identified, the paths including child jobs that were not marked as target child jobs (because other child jobs at the respective conditional forks were marked as child jobs) are not included in the probable paths. At 1116, the longest path of the probable paths is determined as the critical path through the workflow. Operations 1114 and 1116 may involve any one or more of the features of operations 1006 and 1008 described above (with a difference being that the paths analyzed may omit the paths that are determined as not taken based on the transitional probability analysis). Thus, in one embodiment, the predicted runtimes for end-to-end paths including the target child jobs may be compared to determine the end-to-end path having the longest aggregate predicted runtime. In another embodiment, paths may be analyzed individually (e.g., from the start to the end of the workflow using forks and convergence points) and then stitched together to form the critical path (as described above).

At 1118, the results of the critical path runtime prediction are provided. For example, the predicted runtime of the critical path through the workflow may be provided. In some embodiments, one or more statistics associated with the predicted runtime (e.g., a prediction error or confidence interval) may also be provided. In various embodiments, operation 1118 may have any one or more features of operation 914.

Figure 12:
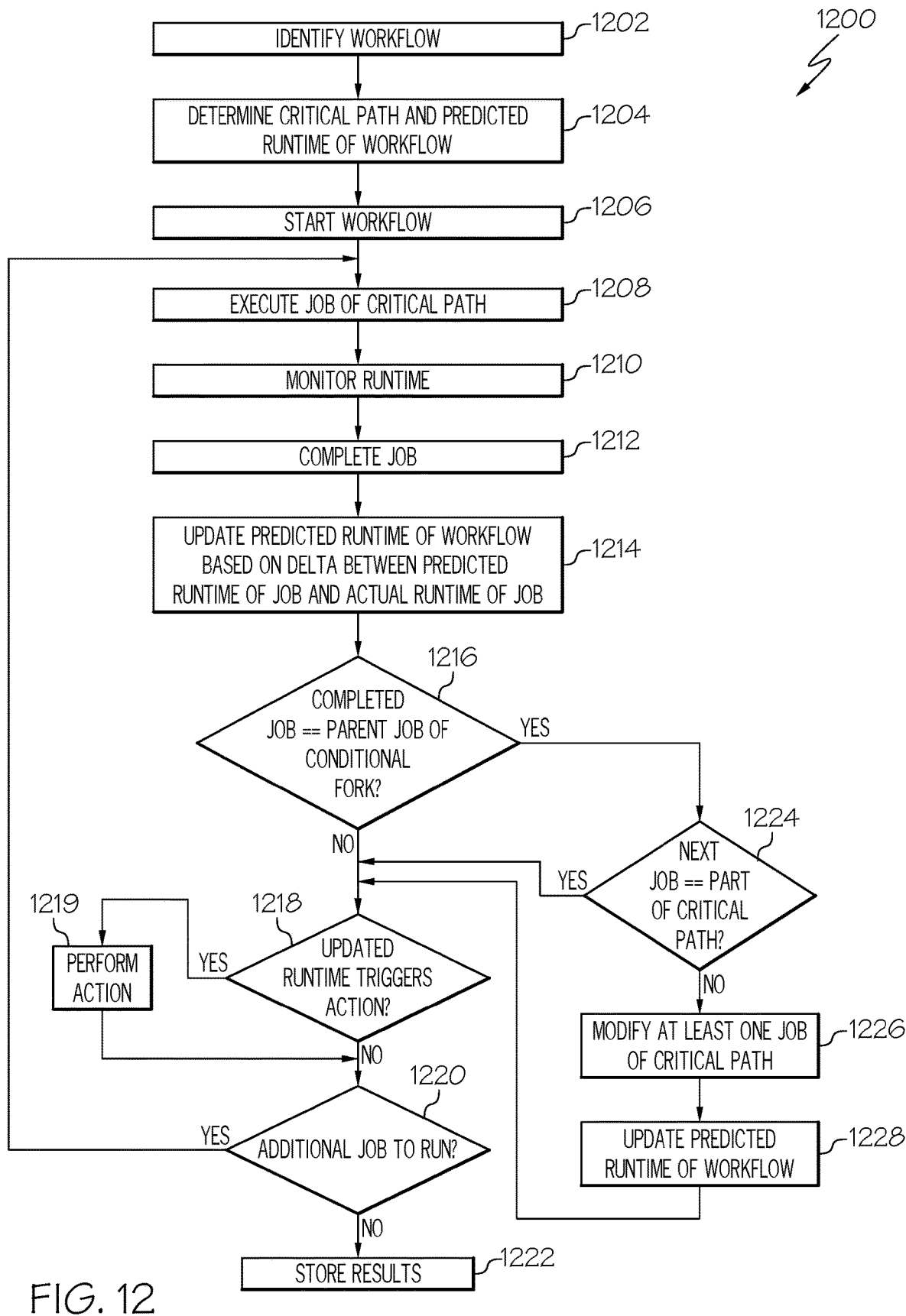
FIG. 12 is an example flow for dynamically updating a predicted runtime of a workflow in accordance with at least one embodiment.

FIG. 12 is an example flow 1200 for dynamically updating a predicted runtime of a workflow in accordance with at least one embodiment. The operations described herein with respect to flow 1200 may be performed by any suitable computing system (e.g., by executing program code using a data processing apparatus). In one embodiment, automation engine system 105 may perform the operations associated with flow 1200. In a particular embodiment, runtime predictor 229 may perform at least some of the operations of flow 1200.

At 1202, a workflow is identified. At 1204, a critical path and a predicted runtime of the workflow is determined. For example, any of the methods described herein (or other suitable methods) for predicting a runtime of the workflow may be performed at 1204.

At 1206, the workflow is started. In various embodiments, the workflow may begin execution on one or more target computing systems. At 1208, a job of the workflow is executed. During execution of the job, a runtime of the job is monitored at 1210. At 1212, execution of the job is completed.

At 1214, a predicted runtime of the workflow is updated based on the delta between a predicted runtime of the job and the actual runtime of the job as determined by the monitoring of the job. As one example, a predicted runtime for a first job of the workflow may be 10 minutes and a predicted runtime for the entire workflow may be 100 minutes. If the actual runtime of the first job is 15 minutes, the overall predicted runtime for the workflow may be adjusted to 105 minutes (based on the 5 minute delta between the predicted runtime for the first job and the actual runtime for the first job). Conversely, if the actual runtime of the first job is 5 minutes, the overall predicted runtime for the workflow may be adjusted to 95 minutes. The predicted remaining runtime may always be calculated at any point in the workflow (at least at any point in between two jobs) as the adjusted overall predicted runtime for the workflow minus the aggregated monitored runtime and the estimated end time of the workflow may be determined as the adjusted overall predicted runtime added to the start time of the workflow (in some embodiments, the predicted end time may be communicated and/or stored in association with the start time of the workflow and may be dynamically adjusted after a job based on the delta between the predicted runtime for the job and the actual monitored runtime of the job.

In various embodiments, rather than (or in addition to) adjusting the predicted runtime of the workflow, a slack/lag time is kept which accumulates the deltas between the predicted run times and actual run times for the jobs of the critical path of the workflow. Thus, if a job finishes more quickly than predicted, time is added to the slack/lag time, but if a job takes longer than predicted, time is deducted from the slack/lag time.

At 1216, a determination is made as to whether the completed job is the parent job of a conditional fork. A parent job of a conditional fork may be a job that is executed immediately before a conditional fork (e.g., job 406 of FIG. 4). If the job is a parent job of a conditional fork, then a determination is made at 1224 as to whether the next job to be executed was included in the critical path (when the runtime of the critical path was predicted). If the next job was included in the critical path, then the flow moves to 1218. However, if the next job was not included in the critical path (indicating that the wrong path was included in the critical path), then at 1226 at least one job of the critical path is modified. For example, any jobs in the path from the child job that was not selected for execution at the conditional fork and a point of convergence with the path that includes the child job that was selected for execution may be removed from the critical path. Additionally, any jobs in the path from the child job that was selected to the point of convergence may be added to the critical path.

At 1228, the predicted runtime of the workflow is updated. For example, the total predicted runtime for the workflow or the remaining predicted runtime for the workflow may be updated to take into account any modifications to the critical path of the workflow. In a particular embodiment, the predicted runtime for the remainder of the workflow may be determined in a manner similar to that described above with respect to the determination of a critical path runtime prior to execution of the workflow (e.g., the predicted runtimes of the individual jobs of the updated critical path may be aggregated or otherwise used to determine a predicted runtime for the remainder of the critical path). In one embodiment, the predicted runtime of the workflow may be updated by subtracting the predicted runtimes for any jobs that are removed from the critical path at 1226 and by adding the predicted runtimes for any jobs that are added to the critical path at 1226. Similarly, in some embodiments, the slack/lag time may be updated by subtracting the predicted runtimes for any jobs that are removed from the critical path at 1226 and by adding the predicted runtimes for any jobs that are added to the critical path at 1226.

After 1228, or if it is determined at 1216 that the completed job is not the parent job of a conditional fork, or if it is determined at 1224 that the next job was included in the critical path; then the critical path is not modified and the flow moves to 1218. At 1218, a determination is made as to whether the updated runtime triggers an action. If an action is triggered, the action may be performed at 1219. Any suitable action may be triggered in response to an updated runtime prediction. For example, the updated runtime may trigger a communication with information about the updated runtime prediction (e.g., the new total predicted runtime for the workflow, the updated remaining predicted runtime for the workflow, an updated predicted end time of the workflow, a slack/lag time comprising a running difference between the expected end time of the workflow and an updated end time based on an updated predicted runtime for the workflow, or other suitable information). For example, the communication may be sent to one or more computing systems associated with an entity managing the operation of the workflow or the scheduling of one or more target systems that execute the jobs of the workflow. As another example, the updated runtime may trigger an automatic adjustment of the workflow. For example, if the actual runtime is longer than the predicted runtime, one or more jobs of the workflow may be omitted or modified (e.g., by changing parameters of the jobs) to reduce the predicted runtime to an acceptable amount of time. For example, jobs (or tasks therein) may be marked as non-essential prior to execution of the workflow and may be candidates to be dropped when the execution of a workflow falls behind schedule. As another example, if the actual runtime is shorter than the predicted runtime, one or more jobs may be automatically added to the workflow (or the parameters may be modified to cause the one or more jobs to perform additional actions, resulting in a longer runtime of the one or more jobs). In some embodiments, any action taken that is expected to change the runtime may trigger an additional update of the predicted runtime for the workflow and/or the slack/lag time. Any suitable computing system, such as automation engine system 105, a target computing system, or a computing system with a UI (e.g., 150*a*) may add or eliminate jobs from the workflow based on the updated predicted runtime. In various embodiments, similar actions may be performed in response to a trigger based on changes to the slack/lag time.

If there are no triggered actions or once the triggered actions have completed, a determination is made as to whether an additional job of the workflow is to be executed at 1220. If an additional job of the workflow is to be executed, the flow returns to 1208. If instead the workflow has completed execution, results of the execution may be stored at 1222. Any suitable information associated with the execution of the workflow may be stored. For example, additional runtime data sets may be stored. As another example, information associated with the workflow as a whole (e.g., predicted runtime, actual runtime, start time, end time, jobs executed, child jobs taken at conditional forks, or other suitable information) may be stored.

In some situations, upon the completion of a particular job of the workflow, the updating of the predicted runtime of the workflow may be postponed until one or more jobs of a path that is executed in parallel with a path containing the particular job are completed. For example, referring to FIG. 6, if job 416 (which was initially chosen as being in the critical path) finishes before one or more of the other jobs executed in parallel (jobs 414, 418, and 420), the updating of the predicted runtime of the workflow may occur after the last of these jobs to complete execution is finished. In a particular embodiment, each time there is a parallel fork in a workflow, the updating of the predicted runtime of the workflow may be postponed until the multiple paths of the parallel fork converge again. In some embodiments, the predicted runtime of the workflow may be updated after each job in a first path of multiple parallel paths branching from a conditional fork, where the first path is included in the critical path when the initial runtime is predicted. The slack/lag time may be updated in a similar manner in various embodiments.

In some embodiments, a modification of the critical path may be made during execution of parallel paths after a conditional fork based on the actual runtime of one or more jobs of the parallel paths. For example, if the actual runtime of a job that is not in the critical path is longer than predicted and results in the sum of the actual runtime through that path plus the remaining predicted runtime through that path being greater than the predicted runtime through a parallel path that was selected for inclusion in the critical path, the critical path may be modified to exclude the path and include the longer running path. As an example, the path selected for inclusion in the critical path may include jobs 422 and 424 as depicted. However, if the actual runtime of job 422 is as predicted (4 min), but the actual runtime of job 426 goes longer than expected (e.g., 10 min), then at the completion of job 426 (or at other suitable time such as during the latter stages of execution of job 426) and while job 424 is being executed, the critical path may be modified to include the path including jobs 426 and 428 since the predicted total time through that path is 14 min total (the actual runtime of 10 min for job 426 plus the predicted runtime of 4 min for job 428), which is greater than the predicted total runtime for the other path which is 12 min (the actual runtime of 4 min for job 422 plus the predicted runtime of 8 min for job 424).

In some embodiments, the critical path may be modified or an action may be triggered before a job completes execution. For example, if a particular job has exceeded its predicted runtime, but is not yet complete, the predicted runtime for the workflow may be modified periodically and/or the critical path may be modified to include the job while the job is still executing. In some embodiments, the progress (e.g., % completion or various milestones) of one or more jobs may be tracked, such that if the progress is behind or ahead of schedule, the predicted runtime for the workflow may be modified accordingly.

In some embodiments, predicted runtimes of yet to be executed jobs may be changed during execution of the workflow (in other embodiments, these predicted runtimes of individual jobs are generated prior to execution of the workflow and do not change during the execution of the workflow). As one example, predicted runtimes may be modified based on conditions associated with one or more target computing systems executing the workflow. For example, if system performance metrics indicate better than expected performance, predicted runtimes for one or more jobs may be reduced accordingly. In one embodiment, a queue comprising tasks for work processes 205 may be monitored. If the rate of incoming messages to the queue becomes greater than the rate of messages being processed, then the system performance may suffer and the predicted runtimes for one or more remaining jobs may be increased accordingly. Conversely, if the rate of messages being processed is greater than the rate of incoming messages, the system performance may improve and the predicted runtimes for one or more remaining jobs may be increased accordingly. In another example, the actual runtime of one or more jobs may be used to adjust the predicted runtimes of one or more jobs of the workflow that have not yet been executed (particularly if processing tasks between the already performed job(s) and the yet to execute job(s) are similar). For example, if a particular job executed in half of its predicted runtime, the predicted runtime of a similar job may be reduced (e.g., by half).

Figure 13:
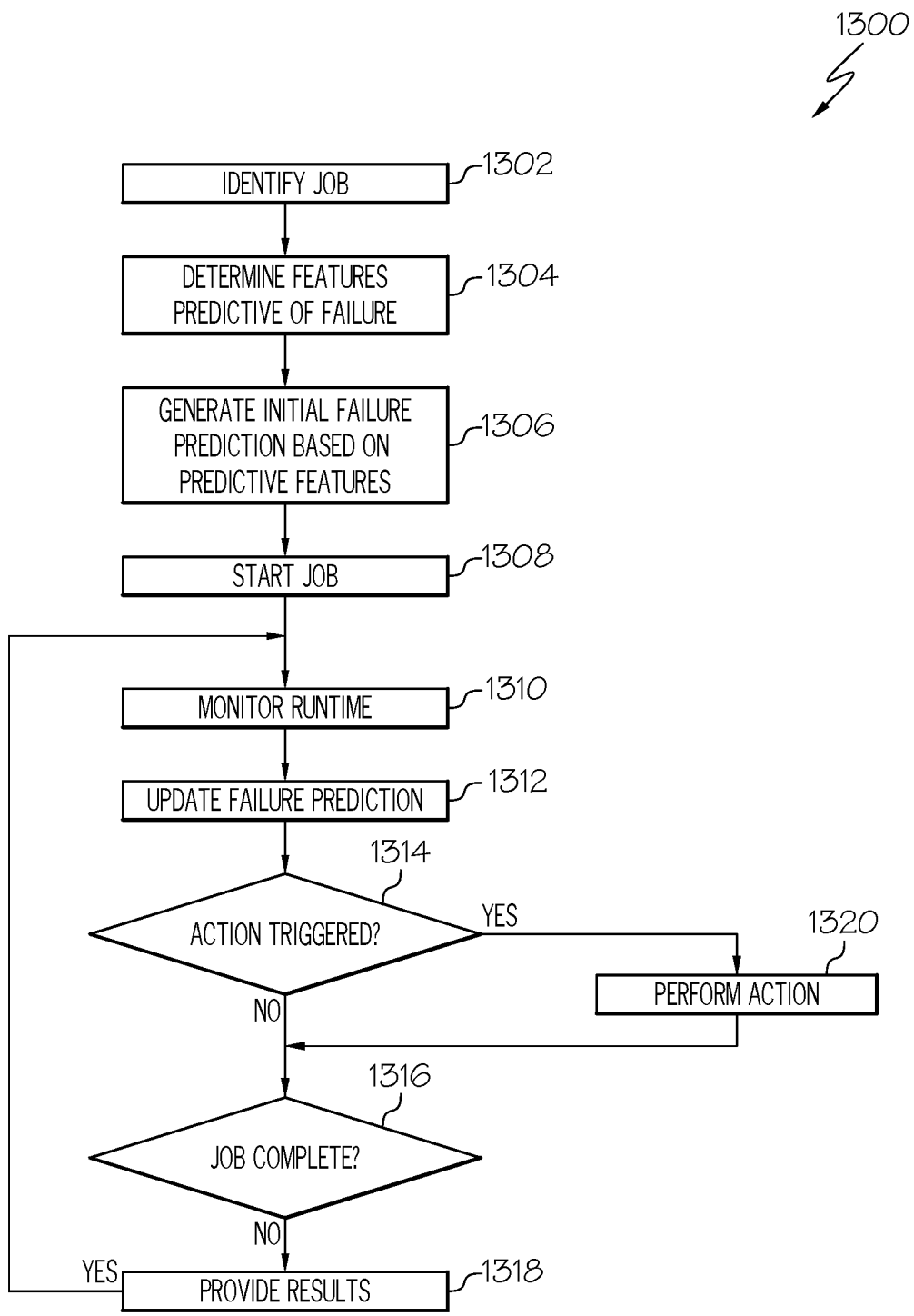
FIG. 13 is an example flow for providing a failure prediction in accordance with at least one embodiment.

FIG. 13 is an example flow 1300 for providing a failure prediction in accordance with at least one embodiment. The operations described herein with respect to flow 1300 may be performed by any suitable computing system (e.g., by executing program code using a data processing apparatus). In one embodiment, automation engine system 105 may perform the operations associated with flow 1300. In a particular embodiment, failure predictor 231 may perform at least some of the operations of flow 1300.

At 1302, a job is identified. In one example, a job may be identified in response to a request to execute a workflow. In some embodiments, the flow 1300 may be performed for each job of a workflow in response to receiving a request identifying the workflow (e.g., a request to schedule or execute the workflow or a request to predict likelihoods of failure for jobs). At 1304, features predictive of failure of the job are identified. In various embodiments, runtime data sets associated with the job may include an indication of whether the job failed to complete execution (see, e.g., FIG. 7 for an example of a plurality of runtimes for executions of a particular job where each runtime is associated with an indication of whether the execution of the job failed). In one embodiment, an analysis is performed using these runtime data sets (and feature values included therein) to determine one or more features predictive of failure of the job. Any of the analyses described herein with respect to determining features predictive of runtime prediction or transitional probability prediction may be used to identify features predictive of job failure. For example, a decision tree analysis may be used (in which the classifiers are "failed" and "completed"). Any other suitable methods for determining features predictive of failure may be implemented.

At 1306, an initial failure prediction is generated based on the predictive features. Similar to the runtime prediction and transitional probability determination scenarios, the one or more features predictive of failure may be used to filter the runtime data sets according to the expected feature values associated with the execution of the job. The remaining data set may then be analyzed to determine what percentage of executions of the job failed to generate the initial failure prediction. A prediction error may also be calculated in association with the initial failure prediction using the error function of a Bernoulli process.

At 1308, execution of the job begins. At 1310, the runtime of the job is monitored. At 1312, the failure prediction for the job may be updated. In some embodiments, the dynamic failure prediction calculated at 1312 may be based on a cumulative distribution function (CDF) of failed jobs plotted against runtimes of the failed jobs. The data set that forms the basis for this cumulative distribution function may be the filtered data set that is based on the features predictive of failure as well as the expected feature values for those features. The CDF for failed jobs may provide, for any given runtime, the percentage of executions of the jobs (of the filtered data set) that had failed by that runtime. For example, referring back to FIG. 7, if a single feature predictive of failure was determined to be the day of week, and the job was expected to be executed on Monday (corresponding to Day 1 in FIG. 7), then a runtime of 20 min may correspond to a CDF value (i.e., the probability) of about 0.95 due to the vast majority of the failed executions on Day 1 having runtimes less than 20 min. In other words, by the time 20 minutes had elapsed, roughly 95% of the failed executions had failed. As another example, a runtime of 13 min may correspond to a CDF value of 0.5 or so due to roughly half of the failed executions on Day 1 having runtimes less than 13 min. While the CDF value itself doesn't necessarily equal the exact likelihood that a job has failed, a higher CDF value does correspond to a higher likelihood that the job has failed.

The CDF for a given job may be used to determine the likelihood of a job failing. At the start of the execution of the job, the likelihood of failure may be set to the initial likelihood of value and may increase monotonically with time (with the degree of increase at various time points dependent on the shape of the CDF) until the likelihood reaches a maximal value, at which point the job will almost certainly fail. The likelihood of failure may expressed using any suitable units. In some embodiments, the calculation of the dynamic likelihood of job failure may include scaling the CDF value in a linear or other fashion and then adding to the initial likelihood of failure.

At 1314, a determination is made as to whether the updated failure prediction triggers an action. If it does not, then a determination is made at 1316 as to whether the job is complete. If the job is complete, then results of the job execution are provided at 1318. If the job is not complete, then monitoring may be resumed at 1310. The failure prediction update may be performed at any suitable interval or may be essentially continuous.

The determination may be based on any suitable information. For example, the determination may be based on whether the updated failure prediction has passed a particular threshold (in some embodiments, different thresholds may trigger different actions). The threshold may be at any value of the CDF (e.g., at the runtime where the probability or y-axis of the function is equal to a predetermined value, such as 0.9). In various embodiments, the threshold is independent of the initial likelihood of failure and dependent only on the value of the CDF. In other embodiments, the threshold may be based on the initial likelihood of failure (e.g., when the initial likelihood of failure is high, the runtime at which the threshold is met may be adjusted downward relative to a scenario where the initial likelihood of failure is low). In some embodiments, the threshold is based on a normalized ratio of successful failure predictions (hit rate) and incorrect failure predictions (false positives) such that an optimal decision criterion boundary is determined. In various embodiments, any of the thresholds may be user configurable, such as through a UI. In some embodiments, default values (e.g., associated with a bias for the threshold) may be set to a sensitivity index (e.g., d-prime value), as defined in signal detection theory, such as 1 or other suitable value.

In some embodiments, whether an action is triggered may depend on the reliability of the updated failure prediction. For example, if the failure prediction is unreliable as indicated by a high prediction error associated with the initial failure prediction and/or the CDF used to update the failure prediction, the system may forego one or more actions (or opt for a less drastic action in lieu of a more drastic action).

At 1314, if an action is triggered, the flow moves to 1320 where the action is performed. Any suitable actions may be triggered in response to an updated failure prediction. For example, an action may be a communication of the failure prediction to an entity (e.g., customer) associated with the workflow being run (so as to allow the entity to take desired action with respect to the job without waiting for it to fail). As another example, an action may be a remedial action, such as skipping the job, stopping the job, modifying one or more parameters associated with the job, and/or restarting the job or entire workflow. In some embodiments, the action may automatically be performed by automation engine system 105 in response to the trigger.

Failure prediction may allow users to intervene and perform remediate actions to ensure a timely execution of a workflow, or with as little delay as possible. In various embodiments, a computing system (e.g., automation engine system 105) may notify that a workflow will not be completed on time, not only due to delayed task, but to workflow failure before the full estimated time of a workflow has elapsed. Following notification of a possible failure, operators associated with the workflow may have the option to restart, or edit workflows or individual jobs within workflows.

Additionally or alternatively to the embodiments above, an updated likelihood of failure may be based on job progress with respect to runtime. For example, a likelihood of failure may increase as the job fails behind an expected rate of progress (e.g., for an amount of data transferred or a number of calculations performed) or decrease as the job moves ahead of the expected rate of progress.

Figure 14:
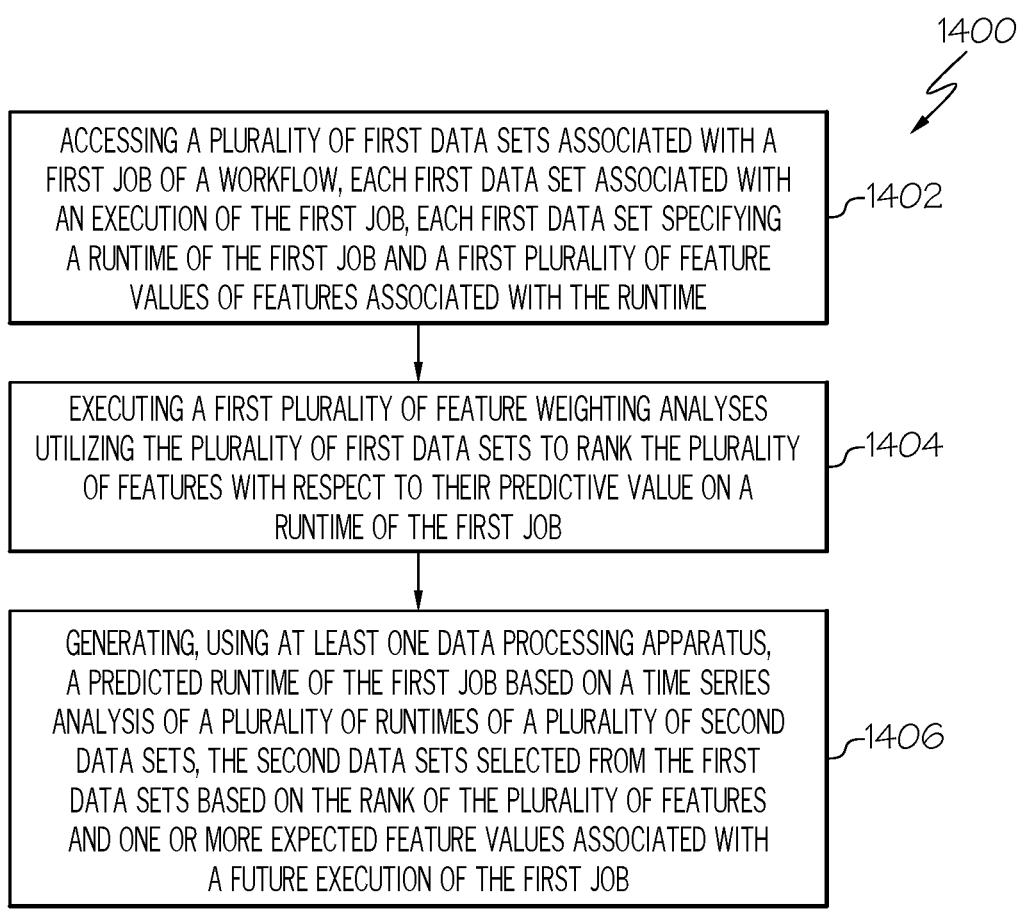
FIG. 14 is an example flow for generating a predicted runtime of a first job in accordance with at least one embodiment.

FIG. 14 is an example flow 1400 for generating a predicted runtime of a first job in accordance with at least one embodiment. The flow may be performed by any suitable data processing apparatus, such as automation engine system 105. At 1402, a plurality of first data sets associated with a first job of a workflow are accessed, each first data set associated with an execution of the first job, each first data set specifying a runtime of the first job and a first plurality of feature values of features associated with the runtimes. At 1404, a first plurality of feature weighting analyses utilizing the plurality of first data sets are executed to rank the plurality of features with respect to their predictive value on a runtime of the first job. At 1406, a predicted runtime of the first job is generated based on a time series analysis of a plurality of runtimes of a plurality of second data sets, the second data sets selected from the first data sets based on the rank of the plurality of features and one or more expected feature values associated with a future execution of the first job.

Figure 15:
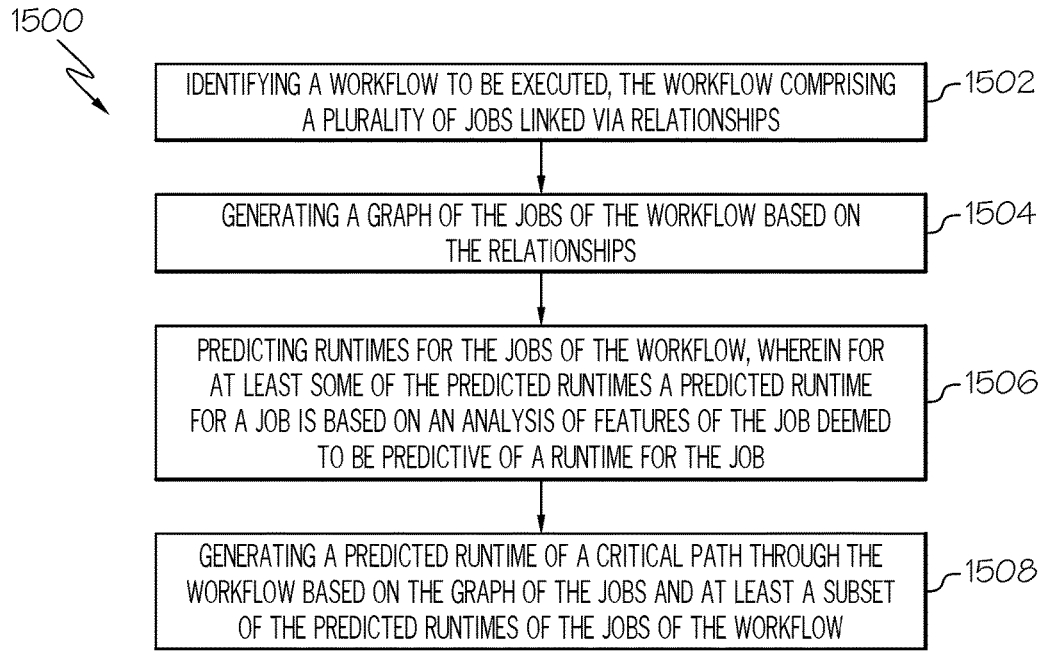
FIG. 15 is an example flow for generating a predicted runtime of a critical path through a workflow in accordance with at least one embodiment.

FIG. 15 is an example flow 1500 for generating a predicted runtime of a critical path through a workflow in accordance with at least one embodiment. The flow may be performed by any suitable data processing apparatus, such as automation engine system 105. At 1502, a workflow to be executed is identified, the workflow comprising a plurality of jobs linked via relationships. At 1504, a graph of the jobs of the workflow based on the relationships is generated. At 1506, runtimes for the jobs of the workflow are predicted, wherein for at least some of the predicted runtimes a predicted runtime for a job is based on an analysis of features of the job deemed to be predictive of a runtime for the job. At 1508, a predicted runtime of a critical path through the workflow is generated based on the graph of the jobs and at least a subset of the predicted runtimes of the jobs of the workflow.

Figure 16:
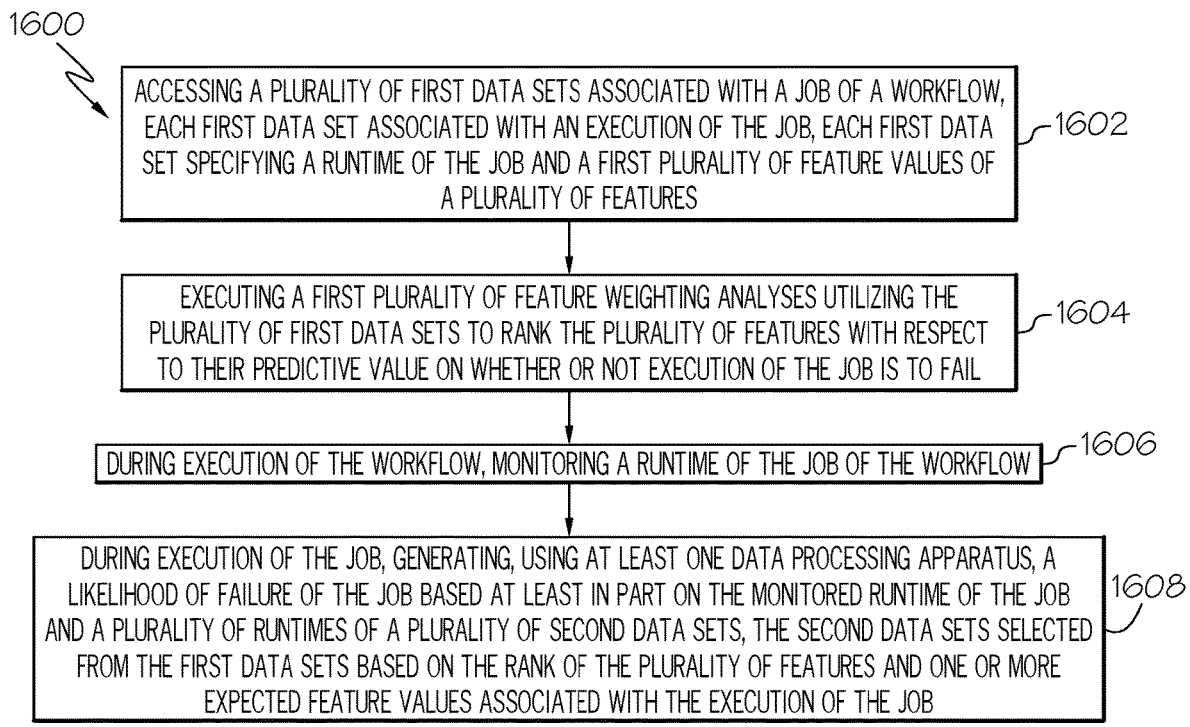
FIG. 16 is an example flow for dynamically updating a likelihood of failure of a job in accordance with at least one embodiment.

FIG. 16 is an example flow 1600 for dynamically updating a likelihood of failure of a job in accordance with at least one embodiment. The flow may be performed by any suitable data processing apparatus, such as automation engine system 105. At 1602, a plurality of first data sets associated with a job of a workflow are accessed, each first data set associated with an execution of the job, each first data set specifying a runtime of the job and a first plurality of feature values of a plurality of features. At 1604, a first plurality of feature weighting analyses are executed utilizing the plurality of first data sets to rank the plurality of features with respect to their predictive value on whether or not execution of the job is to fail. At 1606, during execution of the workflow, a runtime of the job of the workflow is monitored. At 1608, during execution of the job, a likelihood of failure of the job is generated based at least in part on the monitored runtime of the job and a plurality of runtimes of a plurality of second data sets, the second data sets selected from the first data sets based on the rank of the plurality of features and one or more expected feature values associated with the execution of the job.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
accessing a plurality of first data sets associated with a first job of a workflow, each first data set associated with an execution of the first job, each first data set specifying a runtime of the first job and a first plurality of feature values of features associated with the runtime;
executing a first plurality of feature weighting analyses utilizing the plurality of first data sets to rank the first plurality of feature values with respect to their predictive value on a runtime of the first job; and
generating, using at least one data processing apparatus, a predicted runtime of the first job based on a time series analysis of a plurality of runtimes of a plurality of second data sets, the second data sets selected from the first data sets based on the rank of the first plurality of feature values and one or more expected feature values associated with a future execution of the first job.

2. The method of claim 1, wherein the first plurality of feature weighting analyses comprise decision tree analyses.

3. The method of claim 1, wherein the first plurality of feature weighting analyses comprise random forest decision tree analyses.

4. The method of claim 1, wherein the time series analysis used to generate the predicted runtime of the first job utilizes an AutoRegressive Moving Average (ARMA) model, AutoRegressive Integrated Moving Average (ARIMA) model, or a Seasonal AutoRegressive Integrated Moving Average with eXogenous regressors (SARIMAX) model.

5. The method of claim 1, further comprising:
accessing a plurality of third data sets associated with a second job of the workflow, each third data set specifying a runtime of the second job and a second plurality of feature values of the features;
executing a second plurality of feature weighting analyses utilizing the plurality of third data sets to rank the second plurality of feature values with respect to their predictive value on a runtime of the second job; and generating a predicted runtime of the second job based on a time series analysis of a plurality of runtimes of a plurality of fourth data sets, the fourth data sets selected from the third data sets based on the rank determined by the second plurality of feature weighting analyses and on one or more expected feature values associated with a future execution of the second job.

6. The method of claim 5, wherein the rank determined by the first plurality of feature weighting analyses has an order that is different than the rank determined by the second plurality of feature weighting analyses.

7. The method of claim 1, further comprising determining a prediction error corresponding to the predicted runtime.

8. The method of claim 7, wherein the prediction error comprises a root mean square error (RMSE).

9. The method of claim 1, wherein the first plurality of feature weighting analyses are executed in response to a determination that a prediction error associated with a second predicted runtime of the first job is above a threshold.

10. The method of claim 1, wherein the first plurality of feature weighting analyses are executed in response to a determination that a number of first data sets associated with the first job is above a threshold.

11. The method of claim 1, wherein the workflow comprises a plurality of jobs linked together in a sequence.

12. A non-transitory computer readable medium having program instructions stored therein, wherein the program instructions are executable by a computer system to perform operations comprising:
receiving an indication of a workflow to be executed;
in response to the indication of the workflow, identifying a first job of the workflow;
accessing a plurality of first data sets associated with the first job, each first data set associated with an execution of the first job, each first data set specifying a runtime of the first job and a first plurality of feature values of features associated with the runtime;
ranking the first plurality of feature values with respect to their predictive value on a runtime of the first job; and
generating a predicted runtime of the first job when executed as part of the workflow, the predicted runtime based on a time series analysis of a plurality of runtimes of a plurality of second data sets, the second data sets selected from the first data sets based on the rank of the plurality of features.

13. The medium of claim 12, wherein ranking the first plurality of features comprises ranking the plurality of feature values using a plurality of decision tree analyses.

14. The medium of claim 12, wherein the time series analysis used to generate the predicted runtime of the first job utilizes an AutoRegressive Moving Average (ARMA) model, AutoRegressive Integrated Moving Average (ARIMA) model, or a Seasonal AutoRegressive Integrated Moving Average with eXogenous regressors (SARIMAX) model.

15. The medium of claim 12, wherein the program instructions are executable by the computer system to perform operations comprising:
accessing a plurality of third data sets associated with a second job of the workflow, each third data set specifying a runtime of the second job and a second plurality of feature values of the features;
ranking the second plurality of feature values with respect to their predictive value on a runtime of the second job; and
generating a predicted runtime of the first job when executed as part of the workflow, the predicted runtime based on a time series analysis of a plurality of runtimes of a plurality of fourth data sets, the fourth data sets selected from the third data sets based on the rank of the second plurality of feature values for the second job.

16. The medium of claim 15, wherein the rank of the plurality of feature values for the first job has an order that is different than the rank of the second plurality of feature values for the second job.

17. A system comprising:
a data processing apparatus comprising circuitry;
a memory; and
an automation engine executable by the data processing apparatus to:
receive an indication of a workflow to be executed;
in response to the indication of the workflow, identify a first job of the workflow;
access a plurality of first data sets associated with the first job, each first data set associated with an execution of the first job, each first data set specifying a runtime of the first job and a first plurality of feature values of features associated with the runtime;
rank the first plurality of feature values with respect to their predictive value on a runtime of the first job; and
generate a predicted runtime of the first job when executed as part of the workflow, the predicted runtime based on a time series analysis of a plurality of runtimes of a plurality of second data sets, the second data sets selected from the first data sets based on the rank of the first plurality of feature values.

18. The system of claim 17, wherein ranking the plurality of features comprises performing a plurality of decision tree analyses.

19. The system of claim 17, wherein the automation engine is further to:
in response to the indication of the workflow, identify a second job of the workflow;
access a plurality of third data sets associated with a second job of the workflow, each third data set specifying a runtime of the second job and a second plurality of feature values of the features;
rank the second plurality of feature values with respect to their predictive value on a runtime of the second job; and
generate a predicted runtime of the second job when executed as part of the workflow, the predicted runtime based on a time series analysis of a plurality of runtimes of a plurality of fourth data sets, the fourth data sets selected from the third data sets based on the rank of the plurality of feature values for the second job.

20. The system of claim 19, wherein the rank of the plurality of feature values for the first job has an order that is different than the rank of the second plurality of feature values for the second job.

* * * * *